United States Patent
Leonard et al.

(10) Patent No.: US 11,329,279 B2
(45) Date of Patent: *May 10, 2022

(54) PROCESS TO PREPARE AN ELECTRODE FOR AN ELECTROCHEMICAL STORAGE DEVICE

(71) Applicant: Université de Liège, Liège (BE)

(72) Inventors: Alexandre Leonard, Liège (BE); Marie-Laure Piedboeuf, Liège (BE); Nathalie Job, Liège (BE)

(73) Assignee: UNIVERSITÉ DE LIÈGE, Liège (BE)

( * ) Notice: Subject to any disclaimer, the term of this patent is extended or adjusted under 35 U.S.C. 154(b) by 87 days.

This patent is subject to a terminal disclaimer.

(21) Appl. No.: 16/307,728

(22) PCT Filed: May 17, 2017

(86) PCT No.: PCT/EP2017/061786
§ 371 (c)(1),
(2) Date: Dec. 6, 2018

(87) PCT Pub. No.: WO2017/211555
PCT Pub. Date: Dec. 14, 2017

(65) Prior Publication Data
US 2019/0267619 A1    Aug. 29, 2019

(30) Foreign Application Priority Data

Jun. 7, 2016 (EP) .................................. 16173423

(51) Int. Cl.
| | | |
|---|---|---|
| *H01M 4/04* | (2006.01) | |
| *H01M 4/36* | (2006.01) | |
| *H01M 4/1315* | (2010.01) | |
| *H01M 4/133* | (2010.01) | |
| *H01M 4/1391* | (2010.01) | |
| *H01M 4/1393* | (2010.01) | |
| *H01M 4/525* | (2010.01) | |
| *H01M 4/62* | (2006.01) | |
| *H01M 4/66* | (2006.01) | |
| *H01M 4/88* | (2006.01) | |
| *H01M 10/54* | (2006.01) | |
| *H01M 4/58* | (2010.01) | |
| *H01M 4/587* | (2010.01) | |
| *H01M 4/1397* | (2010.01) | |
| *H01M 4/485* | (2010.01) | |
| *H01M 4/136* | (2010.01) | |
| *H01M 4/1395* | (2010.01) | |
| *H01M 4/38* | (2006.01) | |
| *H01M 4/131* | (2010.01) | |

(52) U.S. Cl.
CPC ......... *H01M 4/366* (2013.01); *H01M 4/0404* (2013.01); *H01M 4/0419* (2013.01); *H01M 4/133* (2013.01); *H01M 4/1315* (2013.01); *H01M 4/1391* (2013.01); *H01M 4/1393* (2013.01); *H01M 4/1397* (2013.01); *H01M 4/485* (2013.01); *H01M 4/525* (2013.01); *H01M 4/587* (2013.01); *H01M 4/5825* (2013.01); *H01M 4/622* (2013.01); *H01M 4/625* (2013.01); *H01M 4/661* (2013.01); *H01M 4/663* (2013.01); *H01M 4/8828* (2013.01); *H01M 10/54* (2013.01); *H01M 4/131* (2013.01); *H01M 4/136* (2013.01); *H01M 4/1395* (2013.01); *H01M 4/386* (2013.01); *H01M 4/387* (2013.01); *Y02W 30/84* (2015.05)

(58) Field of Classification Search
None
See application file for complete search history.

(56) References Cited

U.S. PATENT DOCUMENTS

| | | | |
|---|---|---|---|
| 4,959,281 A | | 9/1990 | Nishi et al. |
| 5,158,843 A | * | 10/1992 | Batson ................... H01M 4/04 429/101 |
| 2009/0220678 A1 | | 9/2009 | Kono et al. |
| 2011/0147679 A1 | * | 6/2011 | Inukai ..................... H01M 6/52 252/521.2 |
| 2012/0264022 A1 | | 10/2012 | Hosoe et al. |
| 2013/0037757 A1 | * | 2/2013 | Courtel ................. H01M 4/625 252/503 |
| 2013/0108776 A1 | * | 5/2013 | Li .......................... B05D 3/068 427/8 |
| 2013/0302226 A1 | | 11/2013 | Wang et al. |
| 2015/0236345 A1 | | 8/2015 | Demopoulos et al. |

(Continued)

FOREIGN PATENT DOCUMENTS

| | | |
|---|---|---|
| CN | 101414693 A | 4/2009 |
| EP | 2 306 583 A1 | 4/2011 |

OTHER PUBLICATIONS

International Search Report, dated Jul. 18, 2017 (3 sheets).

(Continued)

*Primary Examiner* — Jeremiah R Smith

(74) *Attorney, Agent, or Firm* — Jacobson Holman PLLC

(57) ABSTRACT

A process to prepare an electrode for an electrochemical storage device by spraying an aqueous slurry composition comprising water, xanthan gum, a source of conducting carbon particles and an active material on an electrode base. The slurry may be made by first mixing solid xanthan gum with the conducting carbon particles and the active material and secondly adding water to the resulting mixture. Alternatively the slurry is obtained by mixing solid xanthan gum with a carbon-based active material and adding water to the resulting mixture obtained.

9 Claims, 16 Drawing Sheets

(56) References Cited

U.S. PATENT DOCUMENTS

| | | | |
|---|---|---|---|
| 2015/0295237 A1* | 10/2015 | Okada ................... | H01M 4/505 |
| | | | 429/223 |
| 2016/0093859 A1* | 3/2016 | Kawaguchi ......... | H01M 2/1673 |
| | | | 429/131 |
| 2016/0172680 A1* | 6/2016 | Tanaka .................. | H01M 4/043 |
| | | | 429/232 |
| 2017/0077520 A1* | 3/2017 | Wu ..................... | H01M 4/0404 |
| 2017/0331110 A1* | 11/2017 | Ishiguchi .............. | B01F 3/1221 |

OTHER PUBLICATIONS

Jae-K.wand Kim et al., "Facile preparation of nanoporous and nanocrystalline LiFePO4 with excellent electrochemical properties" in RSC Advances 2013, vol. 3, pp. 20836-20842, cited in the specification.

Kiyoshi Nakahara et al "Preparation of particulate $Li_4Ti_5O_{12}$ having excellent characteristics as an electrode active material for power storage cells" in Journal of Power Sources, vol. 117 (2003), pp. 131-136.

\* cited by examiner

 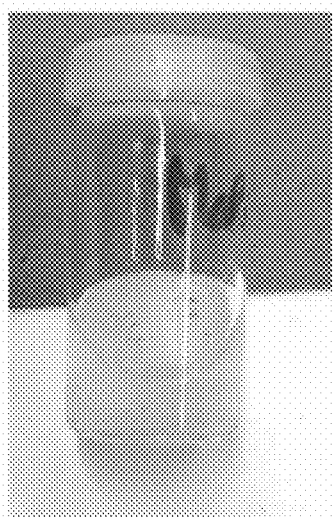
Fig. 13A  Fig. 13B
Fig. 13C  Fig. 13D

| Coating technique | Solvent | Copper foil after adherence test | Adhesive paper after adherence test |
|---|---|---|---|
| Bar coater | H₂O |  |  |
| Spray | H₂O |  |  |
| Spray | NMP |  |  |

PROCESS TO PREPARE AN ELECTRODE FOR AN ELECTROCHEMICAL STORAGE DEVICE

BACKGROUND OF THE INVENTION

The invention is directed to a process to prepare an electrode for an electrochemical storage device. The invention is also directed to an electrochemical storage device which comprises such electrodes and to a method to reclaim valuable components of the electrochemical storage device after use.

An example of a known electrochemical storage device are lithium ion batteries as first described in U.S. Pat. No. 4,959,281 consisting of Li intercalation compounds. The most widespread electrode preparation involves the use of organic binders as fluorine-based polymers, conducting carbon additive and organic solvents such as N-methyl-2-pyrrolidone, as described for example in patent CN101414693 and by Jae-Kwang Kim, Johan Scheers, Young-Jin Choi, Jou-Hyeon Ahn, Gil-Chan Hwang: Facile preparation of nanoporous and nanocrystalline $LiFePO_4$ with excellent electrochemical properties, RSC Adv., 2013, 3, 20836.

The use of these organic binder and solvent compounds as in the above described methods are disadvantageous because of environmental reasons. Another disadvantage is that the recovery of the current collectors after such batteries end-of-life requires the use of toxic organic solvents to dissolve electrode composites as for example described in US2013/0302226.

Methods using more environmentally friendly pathways, such as replacement of organic binder and solvent compounds by water as solvent and water-compatible binders, like in US2013/0108776, also imply the use of binder in conjunction with one or more dispersants, adding therefore a useless mass of additional ingredients which are not participating to the electrochemical reaction of the electrochemical storage device.

SUMMARY OF THE INVENTION

The object of the present invention is to provide a process to prepare an electrode for an electrochemical storage device which does not have one or more of the above disadvantages.

This object is achieved with the following process to prepare an electrode for an electrochemical storage device by spraying an aqueous slurry composition comprising water, xanthan gum, a source of conducting carbon particles and an active material on an electrode base to obtain a covered electrode base, wherein the slurry is obtained by one of the following slurry preparation processes
  (a) comprising of the following in-sequence steps wherein
    (ai) first solid xanthan gum is mixed with the source of conducting carbon and optionally the active material,
    (aii) optionally adding active material to the resulting mixture in case active material was not added or not sufficiently added in step (ai) and (aiii) adding water to the resulting mixture obtained in step (ai) or (aii) such that the content of solids in the resulting aqueous slurry is between 2 and 25 wt. %,
  or (b) comprising of the following in-sequence steps wherein (bi) solid xanthan gum is mixed with a carbon-based active material and (bii) adding water to the resulting mixture obtained in step (bi) such that the content of solids in the resulting aqueous slurry is between 3-12 wt. %.

Applicants found that an electrode may be prepared by the described slurry preparation processes which does not use an environmental disadvantageous organic binder and solvent compound. The electrodes themselves have similar and sometimes better cycling properties as compared with prior art electrodes obtainable by bar coating process involving the use of an organic binder and solvents. Furthermore an electrode is obtained which can be more easily recycled. In other words an electrode base made of metal or any other current conducting surface can be more easily reclaimed from an electrochemical storage device comprising the electrodes as obtainable by the process according to the invention.

The electrochemical storage device for which the electrode is prepared may be a supercapacitor, a sodium ion electrochemical storage device, a lithium ion electrochemical storage device and preferably a lithium ion electrochemical storage device. The below description is mainly directed to the preparation of an electrode for a lithium ion electrochemical storage device.

In slurry preparation processes (a) an active material is used. The choice of active material will depend on the type of electrode one wishes to prepare. When the electrode is an anode electrode for a lithium ion electrochemical storage device, the active material may be for instance a carbon based material, like for example porous carbons, carbon nanotubes, carbon black, graphene and graphite, Si—C composites, Sn—C composites, Sn or Si particles, $LiTiO_2$ or $Li_4Ti_5O_{12}$.

$Li_4Ti_5O_{12}$ is a preferred anode material since it exhibits enhanced safety due to zero strain (negligible volume change) during the Li intercalation-deintercalation processes, and consequently longer service life and shorter charging times. $Li_4Ti_5O_{12}$ can be prepared via various processes such as solid state synthesis, hydrothermal synthesis, spray drying or sol-gel-synthesis, as for example described in US2015236345.

When the electrode is a cathode for a lithium ion electrochemical storage device, the active material may be selected from the group consisting of $LiCoO_2$, $LiNiO_2$, $LiMn_2O_4$, $LiFePO_4$, $LiMnPO_4$, $LiFe_xMn_{1-x}PO_4$ (0<x<1), $LiNi_xMn_yCo_{1-x-y}O_2$, $Li_{i1+x}Ni_yMn_zCo_{1-x-y-z}O_2$, $LiNi_xMn_y$-$Co_zAl_{1-x-y-z}O_2$, $Li_{1+x}Ni_yMn_{1-x}Co_zO_2$, $Cu_2ZnSn(S,Se)_4$. Phosphate-based cathodes, in particular $LiFePO_4$ is preferred since they exhibit enhanced stability, extended lifetime and overcome safety issues occurring upon overheating or overcharging.

The electrode base may be composed of any material which exhibits electronic conductivity and does not undergo any oxidation or reduction at the operating voltages of the electrochemical storage device. Examples are metals, carbon foams, reticulated vitreous carbons, graphite foams or carbon-coated substrates. Preferred materials are carbon and/or nanotube-covered substrates or metals, for example copper, aluminium or stainless steel.

The source of conducting carbon particles as used in slurry preparation processes (a) are suitably Carbon Black particles, carbon nanotubes, graphene or a mixture thereof, conferring good electronic conductivities to the prepared electrodes. Preferably, high-purity carbon-black with low impurities contents and good electronic conductivity is used, like for instance Timcal Super C65 as obtained from Imerys Graphite & Carbon. The anode active material as used in slurry preparation processes (b) are carbon-based materials such as hard carbons or synthetic graphites, preferably graphite, a porous carbon and/or carbon nanotubes. The synthetic graphite particles preferably have particle sizes of between 0.1 and 10 µm.

The xanthan gum is a polysaccharide as for example secreted by the bacterium *Xanthomonas campestris*. The content of xanthan gum as referred to in this description refers to the content of the polysaccharide in terms of solid matter expressed as weight percentage. The water as added in the slurry preparation processes (a) and (b) is preferably ultra-pure water.

In a preferred embodiment, the mixing in step (ai) of solid xanthan gum with the source of conducting carbon and optionally the active material is performed under a shear stress.

By shear stress one means a shear obtained in a mixing composition when using a mortar, a mill mixer, a ball milling device such as a planetary ball milling device.

The mixing of the solid compounds in step (ai) is therefore suitably performed by means of ball milling and preferably by planetary ball milling.

The process according to the invention advantageously provides a flowable aqueous slurry composition that can be sprayed, allowing a more accurate preparation of an electrode for electrochemical storage devices. Indeed the in-sequence steps of the process surprisingly provides a flowable and therefore sprayable composition whereas another sequence of steps provides gelation of the composition.

Consequently, it is now easier and more accurate to characterise an electrode by weighing the dried covered base and compare to the mass of the starting electrode base to finally obtain a measurement of the exact mass of active material involved in the electrode and characterise its electrochemical performance.

The process according to the invention surprisingly and advantageously also provides improved coating adhesion on its electrode base without surface treatment such as corona treatment generally applied to raise surface energy of the surface.

In a further embodiment the slurry is obtained by slurry preparation process (a). In step (ai) or (aii) of such a process, the content of active material is suitably between 70 and 95 wt. %, preferably between 70 and 80 wt. %, the content of solid xanthan gum is suitably between 1 and 10 wt. %, preferably between 2 and 8 wt. % and the content of conducting carbon particles is suitably between 1 and 25 wt. %, preferably between 15 and 25 wt. %. In such a process the active material may be added in a second step (aii) to the mixture obtained in step (ai). Thus the slurry is obtained by slurry preparation process (a) comprising the following steps wherein (ai) first the solid xanthan gum is mixed with the conducting carbon particles, (aii) adding active material to the resulting mixture and (aiii) adding water to the resulting mixture obtained in step (aii), such that the total solid contents in water is between 2 and 25 wt. %. Applicants have found that such a process is suited for anode active materials, such as $Li_4Ti_5O_{12}$ as well as cathode active materials such as $LiFePO_4$ or $LiCoO_2$.

For active materials, like $Li_4Ti_5O_{12}$ or $LiCoO_2$, that display very poor electronic conductivities it may be preferred to obtain the slurry by a slurry preparation process wherein the active material is mixed with the xanthan gum and conducting carbon additive in a first step. Thus such a modified process would comprise the following steps wherein (ai) first the solid xanthan gum is mixed with the conducting carbon particles and active material and (aiii) adding water to the resulting mixture obtained in step (ai).

The slurry obtained by slurry preparation process (b) may be used to prepare electrodes based on active materials, such as hard carbons or graphite. The content of active material in process (b) can range between 70 and 95 wt. %, and preferably between 90 and 95 wt. %.

The obtained slurry of process (a) comprises between 2 and 25 wt. % of solids, suitably between 6 and 12 wt. % of solids. The obtained slurry of process (b) comprises between 3 and 12 wt. % of solids, suitably between 7 and 10 wt. % of solids. In combination with the xanthan gum a slurry would then be obtainable which can be sprayed upon an electrode base. Spraying may be performed according to the well-known spraying techniques, wherein finely dispersed droplets of the slurry are formed in a spray. The droplets will deposit on the surface of the electrode base to form a covered electrode base. The thus obtained covered electrode base is subsequently dried to obtain a dried covered electrode base.

Advantageously, the process according to the invention can be applied to all types of electrode base surfaces such as a planar or a curved surface, a rigid or a flexible surface.

Suitably the mass of the dried covered base is measured and compared to the mass of the starting electrode base to obtain a measurement for the amount of coating as added to the electrode base. The exact measurement of the mass of active material is important in order to know with precision the gravimetric capacity of the final anode or cathode.

Prior to using the electrodes as part of an electrochemical storage device, the electrodes are suitably dried at a low pressure at a temperature between 20 and 150° C.

The invention is also directed towards an electrode comprising an electrode base and a sprayed coating comprising of xanthan gum, a source of conducting carbon and an active material. The components of this electrode may be as described above and the electrode itself may be obtained by the process according to the invention. Such an electrode, which may be advantageously used as part of a lithium ion electrochemical storage device, a sodium-ion electrochemical storage device or a supercapacitor, is found to be recyclable.

The invention is also directed to a lithium ion electrochemical storage device comprising the above described electrode or an electrode obtained by the process according to the invention. The electrochemical storage device may further comprise of an electrolyte and a separator. The electrolyte and separator may be those known for lithium ion batteries.

The separator may be a porous substrate having pores, and examples of the separator that can be used include (a) a porous separator having pores, (b) a porous separator on which a polymer coat layer is formed on one or both surfaces, or (c) a porous separator on which a porous resin coat layer containing inorganic ceramic powder is formed on the surface. The non-limiting examples of these separators include: a polypropylene, polyethylene, polyolefin or aramid porous separator; a separator coated with a polymer film or a gelling polymer coating layer for a solid polyelectrolyte or a gelatinous polyelectrolyte such as polyvinylidene fluoride, polyethylene oxide, polyacrylonitrile and a polyvinylidene fluoride hexafluoropropylene copolymer; and a separator coated with a porous film layer composed of a dispersant for an inorganic filler or an inorganic filler.

The electrolytic solution used in the present invention is not particularly limited, but for example, those in which a lithium salt dissolved as a supporting electrolyte in a non-aqueous solvent can be used. Examples of the lithium salt include a lithium salt such as $LiPF_6$, $LiAsF_6$, $LiBF_4$, $LiSbF_6$, LiAlCl$_4$, LiClO$_4$, CF$_3$SO$_3$Li, C$_4$F$_9$SO$_3$Li, CF$_3$COOLi, (CF$_3$CO)$_2$NLi, (CF$_3$SO$_2$)$_2$NLi and (C$_2$F$_5$SO$_2$)NLi or so. Especially preferably used are LiPF$_6$, LiClO$_4$ and CF$_3$SO$_3$Li, which can easily dissolve in a solvent and exhibit a high dissociation degree. These can be used alone or by combining two or more thereof. The amount of the supporting electrolyte is usually 1 wt % or more, preferably 5 wt % or more, and usually 30 wt % or less and preferably 20 wt % or less, with respect to the electrolytic solution. When the amount of the supporting electrolyte is too small or too large, the ion conductivity declines and the charge and discharge characteristics of the electrochemical storage device decline.

A solvent used in the electrolytic solution is not particularly limited as long as it dissolves the supporting electrolyte, however alkyl carbonates such as dimethyl carbonate (DMC), ethylene carbonate (EC), diethyl carbonate (DEC), propylene carbonate (PC), butylene carbonate (BC) and methyl ethyl carbonate (MEC) or so; esters such as γ-butyrolactone and methyl formate or so; ethers such as 1,2-dimethoxyethane and tetrahydrofuran or so; and sulfur-containing compounds such as sulfolane and dimethylsulfoxide or so may be mentioned. Dimethyl carbonate, ethylene carbonate, propylene carbonate, diethyl carbonate and methyl ethyl carbonate are preferable because especially high ionic conductivity is easily obtained and the operating temperature range is wide. These can be used alone or by combining two or more thereof. In addition, an additive can also be used by adding into the electrolytic solution. As the additive, a carbonate compound such as vinylene carbonate (VC) or so is preferable.

Examples of the electrolytic solution other than the above include a gelatinous polymer electrolyte in which an electrolytic solution is immersed with a polymer electrolyte such as polyethylene oxide and polyacrylonitrile, and an inorganic solid electrolyte such as lithium sulfide, LiI and Li$_3$N or so.

The method for producing a lithium ion electrochemical storage device of the present invention is not particularly limited. For example, the above negative and positive electrodes are stacked against each other via a separator and wound or folded according to the electrochemical storage device shape to place into an electrochemical storage device container and the electrochemical storage device container is sealed after an electrolytic solution is poured into the electrochemical storage device container. Further, an expanded metal, an overcurrent preventing element such as a fuse or a PTC element and a lead plate may be placed depending on the needs thereby the pressure increase inside the electrochemical storage device and overcharge and overdischarge can also be prevented. The shape of the electrochemical storage device may be a stacking cell type, a coin type, a button type, a sheet type, a cylindrical type, a square type, a flat type or the like.

The electrode base may be reclaimed from the above described lithium ion electrochemical storage device by disassembling the electrochemical storage device and contacting the separate electrodes with water to obtain an electrode base which does not have a sprayed coating comprising of xanthan gum, conducting carbon particles and an active material. Suitably the electrode base is agitated during contact with water, for example by stirring the water solution or by ultra-sound. The water can be common tap-water, or, if the active materials are to be recycled separately, preferably ultra-pure water should be used.

BRIEF DESCRIPTION OF THE DRAWINGS

FIG. 13 illustrates the gel-like mixture formed upon dissolving xanthan gum alone in water (FIGS. 13 A and B) and the gel-like mixture formed upon adding water to a hand-mixed solid mixture containing xanthan gum, conducting carbon and $LiFePO_4$ (FIGS. 13 C and D). (as described in example 12).

DETAILED DESCRIPTION OF THE INVENTION

Figure 1:
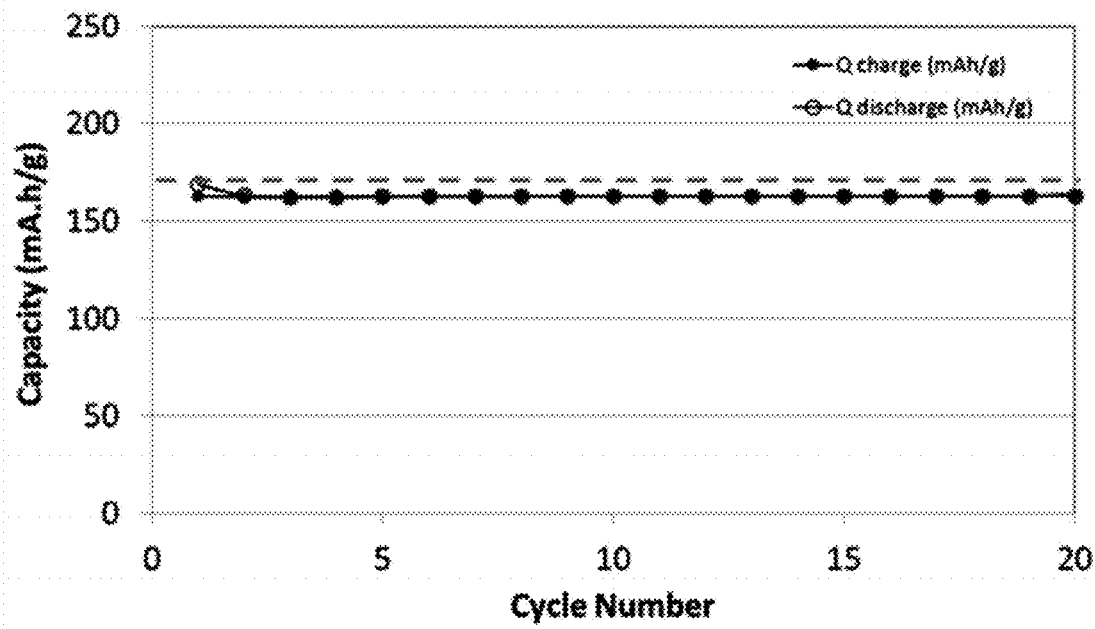
FIG. 1 illustrates the charge and discharge specific capacities as a function of cycle number at a rate of C/5 for the sprayed LTO/Cu electrode prepared according to the invention (Example 1). The horizontal dotted line indicates the theoretical specific capacity of the active material.

The invention shall be illustrated by the following non-limiting examples.

Example 1

This example describes the process of preparing various types of electrodes.

0.200 g xanthan gum (Binder, Sigma Aldrich) and 0.800 g Carbon Super C65 (Conducting Carbon, Timcal) were mixed in a planetary mill (Fritsch Monomill P6) in stainless-steel jars with 20 stainless-steel balls (diameter 10 mm). Mixing was performed at 400 rpm, 5×1 minute, 15 seconds pause and in reverse mode.

Then, 0.125 g of this mixture were put together with 0.375 g of active material, either $Li_4Ti_5O_{12}$ (anode material, as prepared for all examples unless stated otherwise by the procedure described in Kiyoshi Nakahara, et al., Preparation of particulate $Li_4Ti_5O_{12}$ having excellent characteristics as an electrode active material for power storage cells, Journal of Power Sources 117 (2003) 131-136) or $LiFePO_4$ (cathode material, Pholicat FE100 as obtained from beLife), leading to a composition by weight percentage of 75:20:5 (active material:conducting carbon:binder). This mixture was dried during 1 hour at 100° C. 3.6 g of MilliQ water were then added resulting in a slurry containing 12 wt. % solids, followed by magnetic stirring during 3 hours at 1000 rpm. The slurry was then sprayed on 20 pre-weighed current collector Cu disks in the case of anode materials (Ø 14 mm, punched from a copper foil, MTI corp.), on pre-weighed current collector Al disks in the case of cathode materials (Ø 14 mm, punched from an alimentary Reynolds Al foil)) and/or on pre-weighed current collector stainless-steel disks for both types of materials (Ø 15.5 mm, MTI corp.) using an airbrush (Harder & Steenbeck Airbrush Evolution Silverline fPc, 0.4 mm nozzle and needle). The coated disks were dried during 2 hours at ambient temperature and overnight at 60° C. The weight of active material was determined with very good accuracy (error lower than 1%) upon weighing the electrodes after drying and subtracting the mass of the corresponding bare current collector disk. An average mass of active material of 2.2 mg/cm$^2$ was obtained regardless the used active material. The obtained electrodes were then dried at 120° C. under vacuum during 2 hours and transferred to an Ar-filled glove-box (MBraun) for making half-cell assemblies.

The electrochemical measurements were carried out in CR2032 coin cells, where the tested material acted as cathode and a Li-metal disk as anode. A Celgard® separator soaked with 80 µL of LP71 (1 M LiPF6 in Ethylene carbonate:Diethylcarbonate:Dimethylcarbonate (EC:DEC:DMC) 1:1:1 weight ratios) or Ethylene carbonate Diethylcarbonate (EC:DEC) 1:1 weight ratio electrolyte was placed in-between. Charge-discharge cycles were recorded up to rates of 10C (6 minutes to fully charge the cell, 6 minutes to fully discharge the cell again) between 1.0 and 2.5 V (vs. Li$^+$/Li) or 2.0 and 4.2 V (vs. Li$^+$/Li) for anode and cathode materials respectively with a Biologic VMP3 multichannel potentiostat or a Neware battery cycler at 25° C.

Example 2

Example 1 was repeated for preparing a graphite (anode material, KS6L, Timcal) covered electrode. In this example however no conducting carbon was added to the mixture.

Briefly, 0.025 g of xanthan gum (Binder, Sigma Aldrich) was mixed with 0.475 g graphite (KS6L, Timcal), leading to a composition having a weight percentage of 95 wt. % graphite and 5 wt. % xanthan gum. This mixture was dried during 1 hour at 100° C. and 4.6 g of MilliQ water was subsequently added resulting in a slurry consisting of 9.8 wt. % solids. The next steps were as in Example 1. An average mass of active material of 3.6 mg/cm² on the electrode was obtained.

Example 3 (Comparison)

This example describes the preparation of LTO/Cu electrodes by means of a bar coater following a widely used conventional method. $Li_4Ti_5O_{12}$ (LTO) (anode material, as prepared for all examples unless stated otherwise by the procedure described in Kiyoshi Nakahara, et al., Preparation of particulate $Li_4Ti_5O_{12}$ having excellent characteristics as an electrode active material for power storage cells, Journal of Power Sources 117 (2003) 131-136) was dispersed in an organic solvent (NMP, N-methyl-2-pyrrolidone) with PVDF (polyvinylidene fluoride) as a binder. The chosen composition by mass was: 75 wt. % LTO, 10 wt. % PVDF, 15 wt. % Conducting Carbon (Super C65, Timcal). The obtained organic slurry was coated on a Cu-foil by bar-coater at ambient temperature. This foil was then dried at 60° C. and 14-mm electrodes were punched from this coating. The mass of active material was determined upon weighing these electrodes and subtracting the average mass of bare Cu-disks of the same size.

Example 4

In this example the cycling performance at C/5 in half-cells of LTO ($Li_4Ti_5O_{12}$, anode material) on a Cu disc according to the invention and as obtained in Example 1 were compared to the cycling performance at C/5 for the LTO/Cu disc as obtained by means of bar coater in Example 3.

Galvanostatic cycling was performed at a rate of C/5 (5 hours needed to fully charge the cell, 5 hours to fully discharge the cell).

FIG. 1 shows the charge and discharge specific capacities as a function of cycle number and the horizontal dotted line indicates the theoretical specific capacity of the active material for the sprayed LTO/Cu electrode of Example 1. The specific capacity after 20 cycles was 163 mAh/g.

Figure 2:
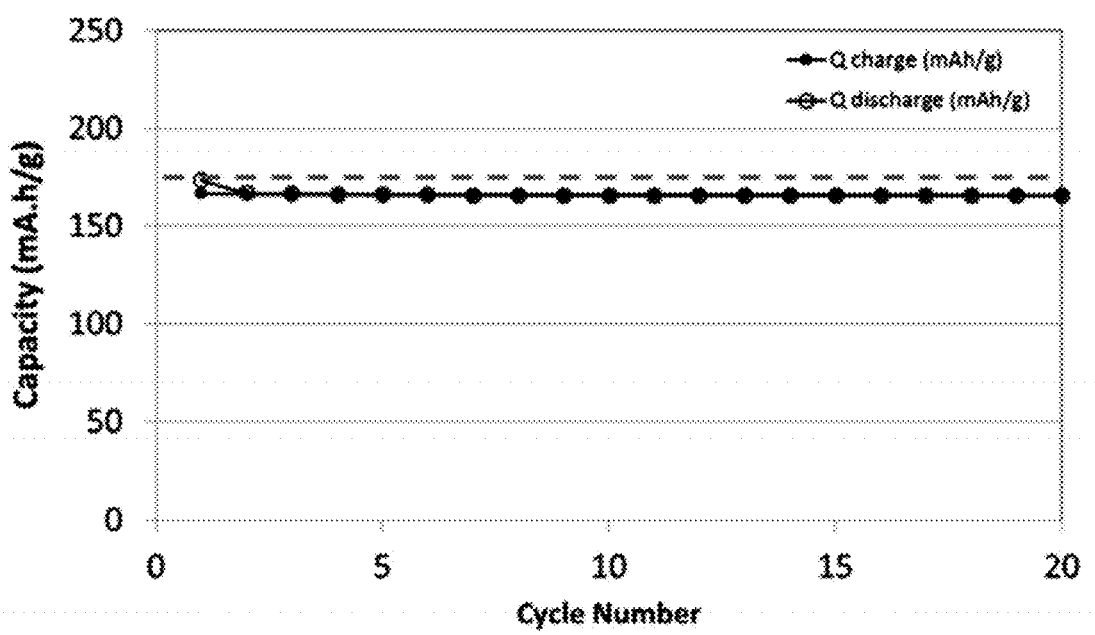
FIG. 2 illustrates the charge and discharge specific capacities as a function of cycle number at a rate of C/5 for the LTO/Cu electrodes processed by bar-coater of Example 3. The horizontal dotted line indicates the theoretical specific capacity of the active material.

FIG. 2 shows the charge and discharge specific capacities as a function of cycle number and the horizontal dotted line indicates the theoretical specific capacity of the active material for the bar coater LTO/Cu electrode of Example 3. The specific capacity after 20 cycles was 166 mAh/g.

This experiment shows that the specific capacity after 20 cycles of the sprayed LTO/Cu electrode of Example 1 is very close to that of the bar coater LTO/Cu electrode of Example 3, and the cycling stability is the same. The observed differences cannot be considered as significant owing to the errors occurring on the mass determinations of electrodes obtained by the organic bar-coating process.

Example 5

In this example the cycling performance at variable rates in half-cells of LTO ($Li_4Ti_5O_{12}$, anode material) on a Cu disc according to the invention and as obtained in Example 1 were compared to the cycling performance at variable rates for the LTO/Cu disc as obtained by means of bar coater in Example 3.

Galvanostatic cycling was performed first at a rate of C/5 (5 hours needed to fully charge the cell, 5 hours to fully discharge the cell) for a given number of cycles, followed by cycling at higher rates (C/2, 1C, 2C, 5C, 10C and back to C/5), for 10 cycles at each rate. (10C: 6 minutes needed to fully charge the cell, 6 minutes to fully discharge the cell).

Figure 3:
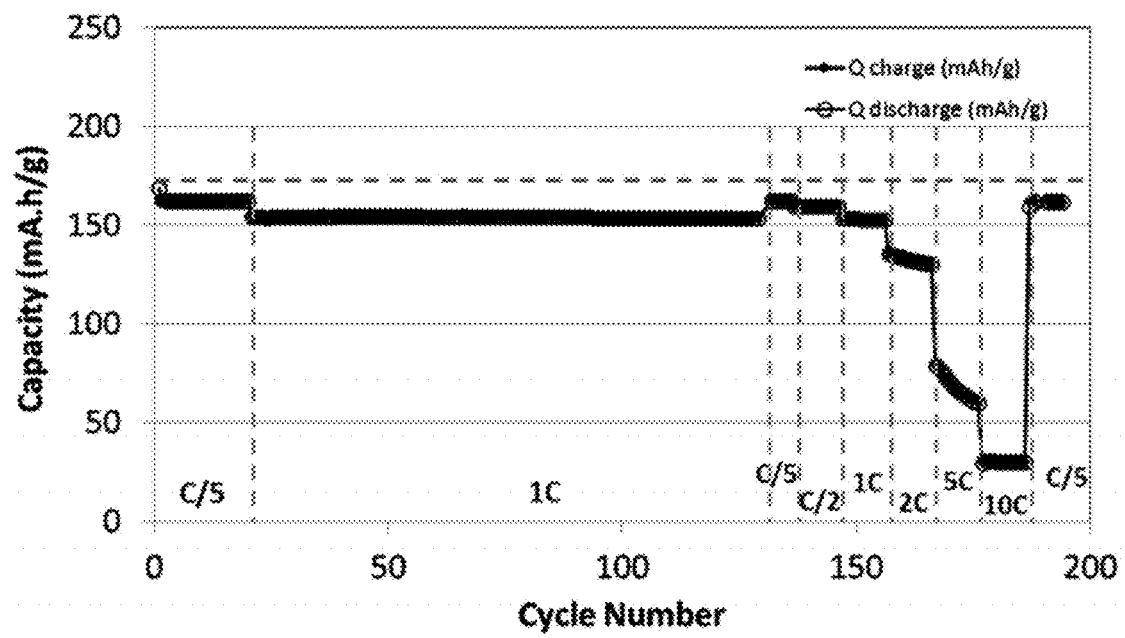
FIG. 3 illustrates the charge and discharge specific capacities as a function of cycle number and at different rates of C/5, C/2, 1C, 2C, 5C, 10C for the sprayed LTO/Cu electrode prepared according to the invention (example 1). The horizontal dotted line indicates the theoretical specific capacity of the active material.

FIG. 3 shows the charge and discharge specific capacities as a function of cycle number and the horizontal dotted line indicates the theoretical specific capacity of the active material for the sprayed LTO/Cu electrode of Example 1.

Figure 4:
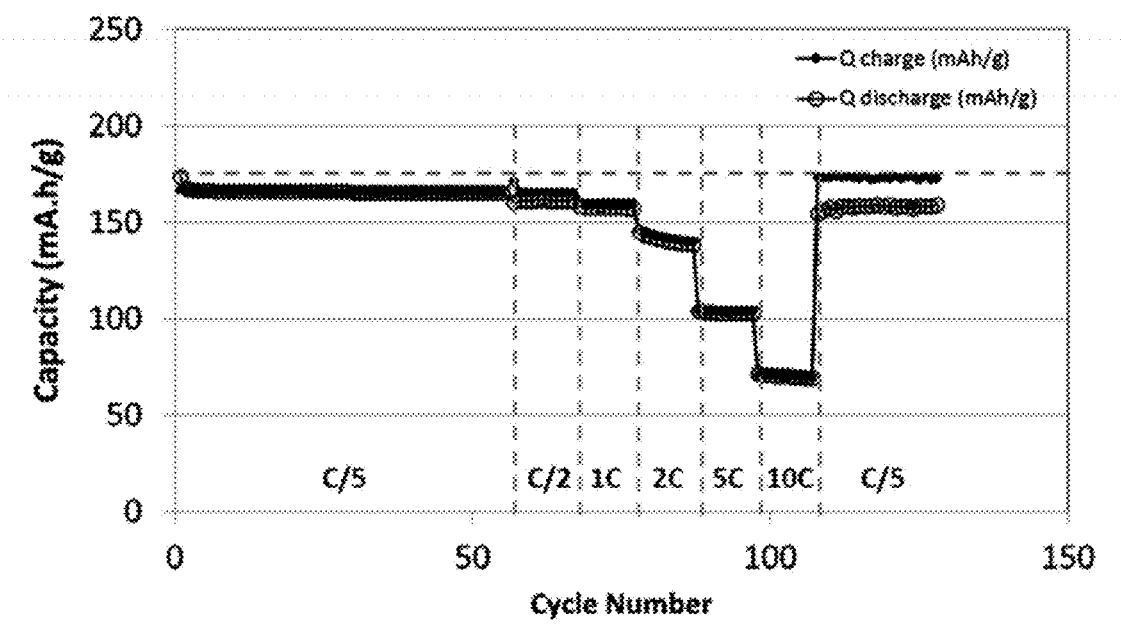
FIG. 4 illustrates the charge and discharge specific capacities as a function of cycle number and at different rates of C/5, C/2, 1C, 2C, 5C, 10C for the LTO/Cu electrodes processed by bar-coater of Example 3. The horizontal dotted line indicates the theoretical specific capacity of the active material.

FIG. 4 shows the charge and discharge specific capacities as a function of cycle number and the horizontal dotted line indicates the specific theoretical capacity of the active material for the bar coater LTO/Cu electrode of Example 3.

The specific capacity per cycle is also listed in the below Table 1.

TABLE 1

| Rate | Specific capacity Example 1 (mAh/g) | Specific capacity Example 3 (mAh/g) |
|---|---|---|
| C/5 | 162 | 166 |
| C/2 | 159 | 163 |
| C | 143 | 160 |
| 2C | 133 | 143 |
| 5C | 66 | 104 |
| 10C | 30 | 70 |
| C/5 | 162 | 165 |

The global behavior is the same for the electrodes of Example 1 (aqueous slurry) and Example 3 (organic slurry). The comparison of specific capacities reported in the Table 1 shows that the performances are somewhat lower in the case of the aqueous coatings, especially at high rates (5C and 10C). Full recovery of specific capacity at C/5 after cycling at high rates is observed in both cases.

Example 6

Example 6 shows the cycling performance in half-cells of LFP (LiFePO₄, cathode material, Pholicat FE100, beLife) at variable rates for aqueous sprayed slurries, with different contents in active material.

Two electrodes were prepared according to the procedure of Example 1: 75 wt. % LFP, 5 wt. % xanthan gum, 20 wt. % Conducting Carbon (Super C65, Timcal) and 70 wt. % LFP, 5 wt. % xanthan gum, 25 wt. % Conducting Carbon (Super C65, Timcal). The fraction of total solids in water was 12 wt. %. The obtained aqueous slurry was then sprayed at ambient temperature on pre-weighed 14-mm Al-disks. The electrodes were weighed after drying at 60° C., allowing for the precise determination of the mass of active material.

Galvanostatic cycling was performed first at a rate of C/5 (5 hours needed to fully charge the cell, 5 hours to fully discharge the cell) for a given number of cycles, followed by cycling at higher rates (C/2, 1C, 2C, 5C, 10C), with 10 cycles of charge-discharge at each rate. This procedure was repeated 3 times on the same cell.

Figure 5:
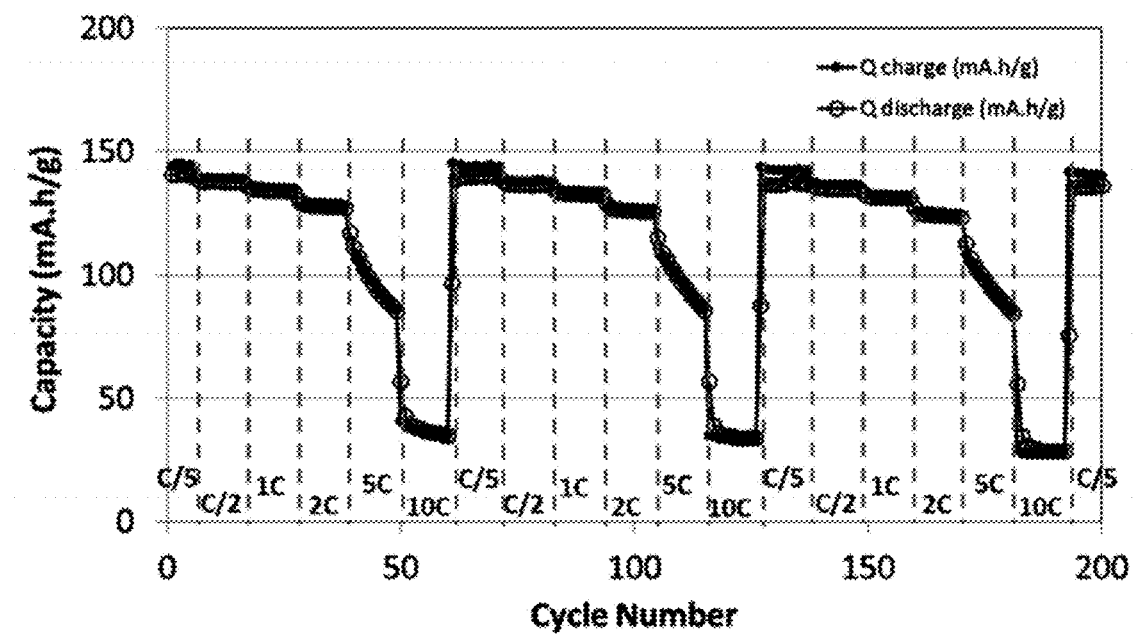
FIG. 5 illustrates the charge and discharge specific capacities as a function of cycle number and at different rates of C/5, C/2, 1C, 2C, 5C, 10C for the sprayed LFP/Al electrodes containing 75 wt. % LFP(LiFePO$_4$) of example 6.
Figure 6:
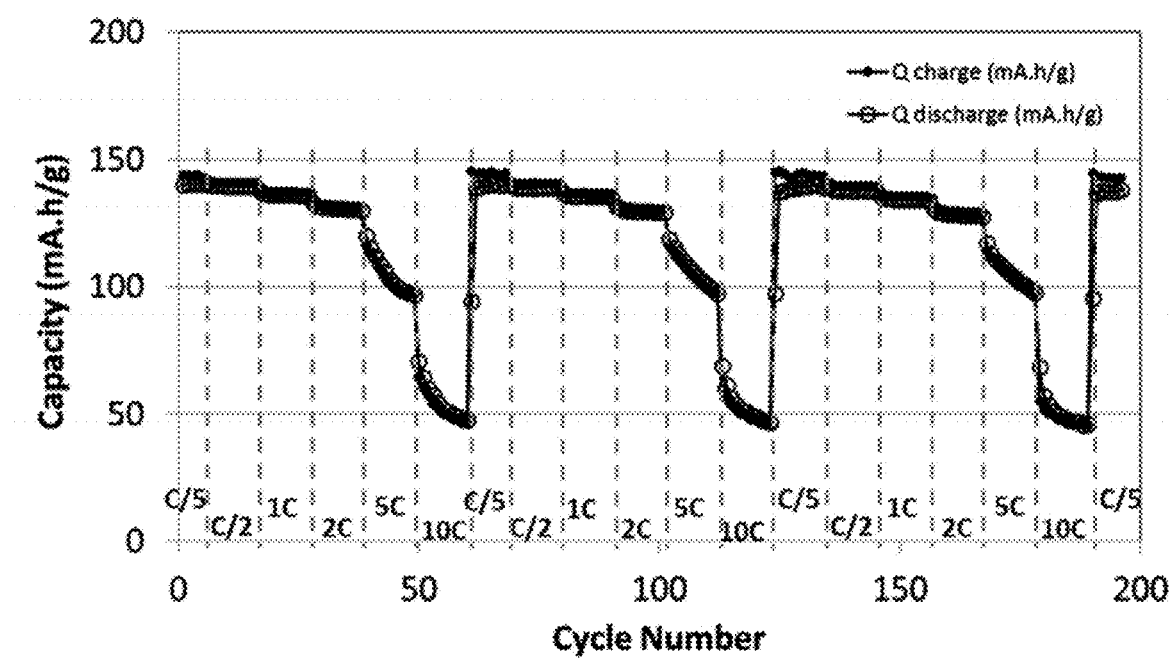
FIG. 6 illustrates charge and discharge specific capacities as a function of cycle number and at different rates of C/5, C/2, 1C, 2C, 5C, 10C for the sprayed LFP/Al electrodes containing 70 wt. % LFP(LiFePO$_4$) of example 6.

FIG. 5 shows the charge and discharge specific capacities as a function of cycle number for the electrode with 75 wt. % LFP and FIG. 6 shows the charge and discharge specific capacities as a function of cycle number for the electrode with 70 wt. % LFP.

For both contents of LFP, stable cycling is observed up to 2C (30 minutes needed to fully discharge the cell, 30 minutes to fully charge again), with high values of specific capacities. Superior performances in terms of capacity at high rates are obtained when the content of LFP decreases from 75 to 70 wt. %, i.e. when the relative quantity of conducting carbon is increased.

In each case, the specific capacities are recovered after cycling at very high rates, indicating the stability of the coatings.

Example 7

Example 7 shows the cycling performance in a half-cell of Graphite (KS6L, anode material, Timcal) at C/5 for an aqueous sprayed slurry. The electrode was prepared as described in Example 2 on 14-mm Cu-disks. The horizontal dotted line indicates the theoretical specific capacity of the active material for the sprayed Graphite/Cu electrode of Example 2.

Galvanostatic cycling was performed at a rate of C/5 (5 hours needed to fully charge the cell, 5 hours to fully discharge the cell).

Figure 7:
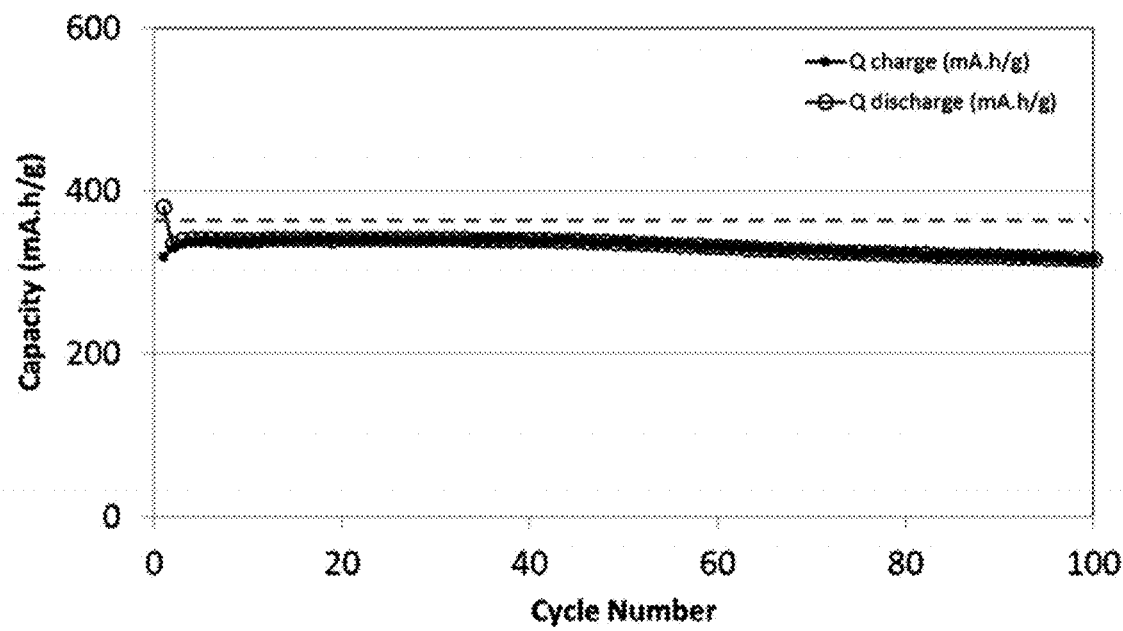
FIG. 7 illustrates the charge and discharge specific capacities as a function of cycle number at a rate of C/5 for the sprayed Graphite/Cu electrode prepared according to the invention (as described in example 2). The dotted line indicates the theoretical specific capacity of the active material.

FIG. 7 and the Table 2 below show the charge and discharge specific capacities as a function of cycle number and the dotted line indicates the theoretical specific capacity of the active material.

TABLE 2

| Cycle | Specific capacity (mAh/g) |
|---|---|
| 1 | 320 |
| 10 | 339 |
| 25 | 340 |
| 50 | 336 |
| 75 | 324 |
| 100 | 317 |

A specific capacity of about 340 mAh/g, which remains stable for 50 cycles, is obtained for this coating, which corresponds to 91% of the theoretical specific capacity of graphite. A slow decay is then observed, which could be attributed to the fact that no conducting carbon was added to the solid mixture.

Example 8

In this example the cycling performance at variable rates in half-cells of LTO ($Li_4Ti_5O_{12}$, anode material) on a Cu disc according to the invention were compared to the cycling performance at variable rates for the LTO/Cu disc as obtained by means of bar coater in Example 3.

The LTO ($Li_4Ti_5O_{12}$, anode material) on a Cu disc electrode was prepared according to Example 1, except in that the active material is directly mixed with the conductive carbon and the binder in weight percentages of 80:15:5 or 75:20:5 (active material:conducting carbon:xanthan gum). This mixture is dried during 1 hour at 100° C. and then subjected to planetary milling following the same procedure as described for Example 1, allowing for a more intimate contact between the components of the solid mixture. The latter is then dispersed in MilliQ water (12 wt. % solids), followed by magnetic stirring and spraying at ambient temperature on pre-weighed 14-mm Cu-disks. The electrodes were weighed after drying at 60° C., allowing for the precise determination of the mass of active material.

Galvanostatic cycling was performed first at a rate of C/5 (5 hours needed to fully charge the cell, 5 hours to fully discharge the cell) for a given number of cycles, followed by cycling at higher rates (C/2, 1C, 2C, 5C, 10C and back to C/5), for 10 cycles at each rate. (10C: 6 minutes needed to fully charge the cell, 6 minutes to fully discharge the cell)

Figure 8:
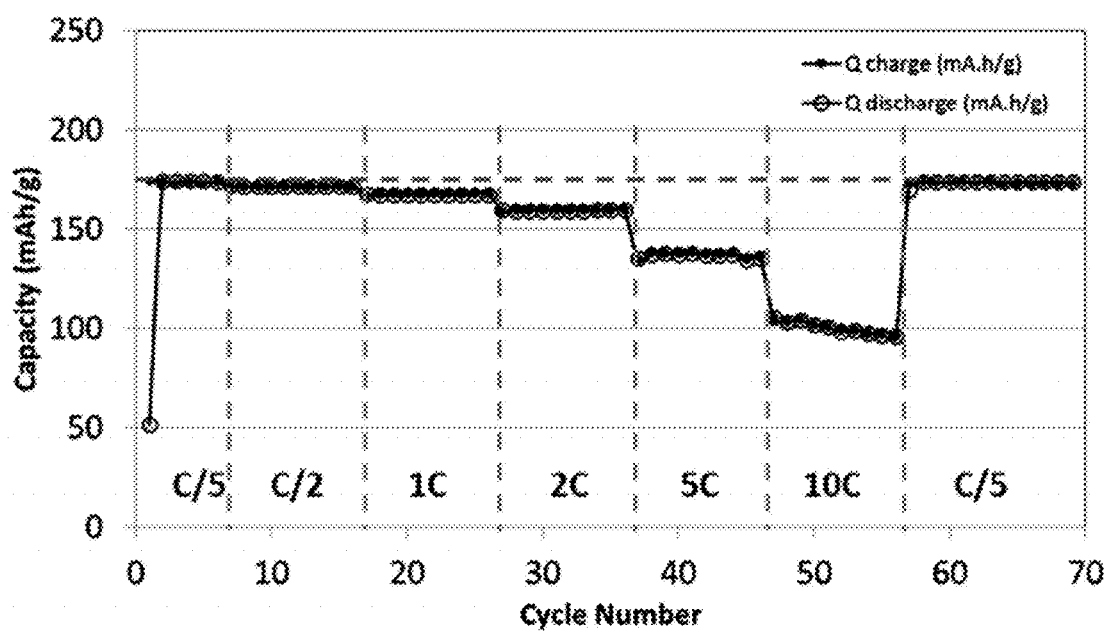
FIG. 8 illustrates the charge and discharge specific capacities as a function of cycle number at different rates of C/5, C/2, 1C, 2C, 5C, 10C of the LTO (Li$_4$Ti$_5$O$_{12}$, anode material) on a Cu disc electrode prepared according to the invention (as described in example 8) and the horizontal dotted line indicates the theoretical specific capacity of the active material.
Figure 9:
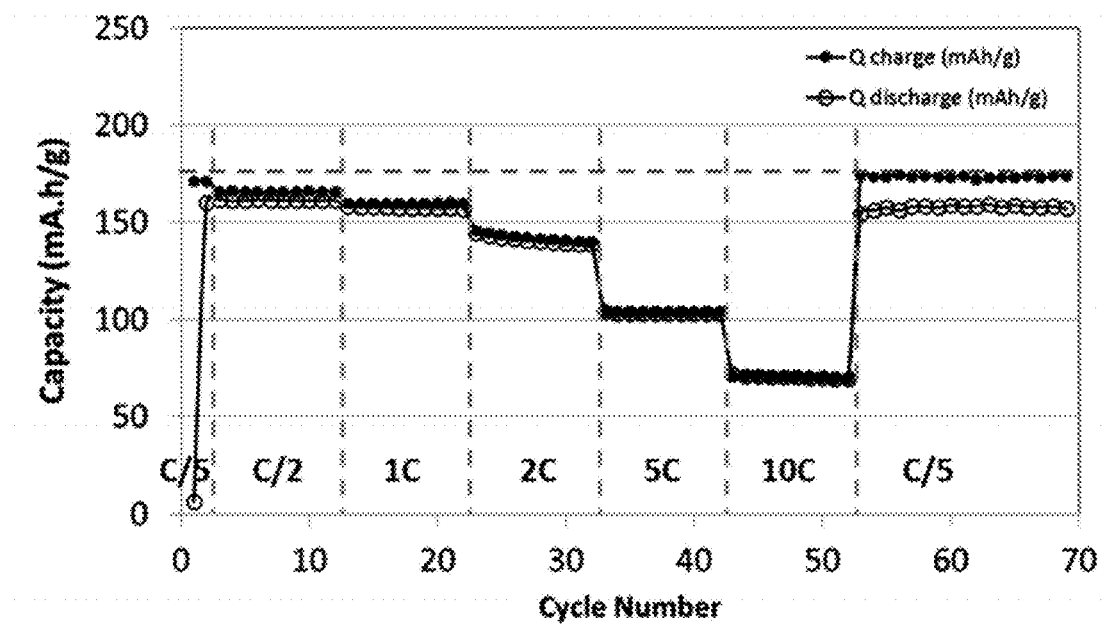
FIG. 9 illustrates the charge and discharge specific capacities as a function of cycle number at different rates of C/5, C/2, 1C, 2C, 5C, 10C of the LTO/Cu electrode as obtained by means of bar coater (procedure of Example 3) and the horizontal dotted line indicates the theoretical specific capacity of the active material.

FIG. 8 shows the charge and discharge specific capacities as a function of cycle number of the LTO ($Li_4Ti_5O_{12}$, anode material) on a Cu disc electrode prepared according to the procedure of the above paragraph and the horizontal dotted line indicates the theoretical specific capacity of the active material. FIG. 9 shows the charge and discharge specific capacities as a function of cycle number of the LTO/Cu electrode as obtained by means of bar coater (procedure of Example 3) and the horizontal dotted line indicates the theoretical specific capacity of the active material.

The global behavior is the same for the aqueous and organic slurries. Improved specific capacities for each rate of cycling are however obtained in the case of the aqueous pathway with xanthan gum as a binder.

The comparison of these results with Example 5 suggests that the optional addition of the active material (step aii) to the xanthan gum—conducting carbon mixture prior to ball-milling is more adapted for insulating active materials. Indeed, the ball-milling step of all the components will lead to an enhanced interaction between the LTO active material and the conducting carbon additive, which will result in enhanced cycling performances, especially at high rates, favoring the electron transfers.

Example 9

Example 9 illustrates the cycling performance in half-cells of LTO ($Li_4Ti_5O_{12}$, anode material) at 1C for aqueous sprayed slurries with stainless-steel disks as current collectors.

The LTO ($Li_4Ti_5O_{12}$, anode material) on a stainless-steel (SS) disc electrode was prepared according to Example 1, except in that the active material is directly mixed with the conductive carbon and the binder in weight percentages of 80:15:5 or 75:20:5 (active material:conducting carbon:xanthan gum). This mixture is dried during 1 hour at 100° C. and then subjected to planetary milling following the same procedure as described for Example 1, allowing for a more intimate contact between the components of the solid mixture. The latter is then dispersed in MilliQ water (12 wt. % solids), followed by magnetic stirring and spraying at ambient temperature on pre-weighed 15.5-mm SS-disks. The electrodes were weighed after drying at 60° C., allowing for the precise determination of the mass of active material.

Galvanostatic cycling was performed at a rate of 1C (1 hour needed to fully charge the cell, 1 hour to fully discharge the cell).

Figure 10:
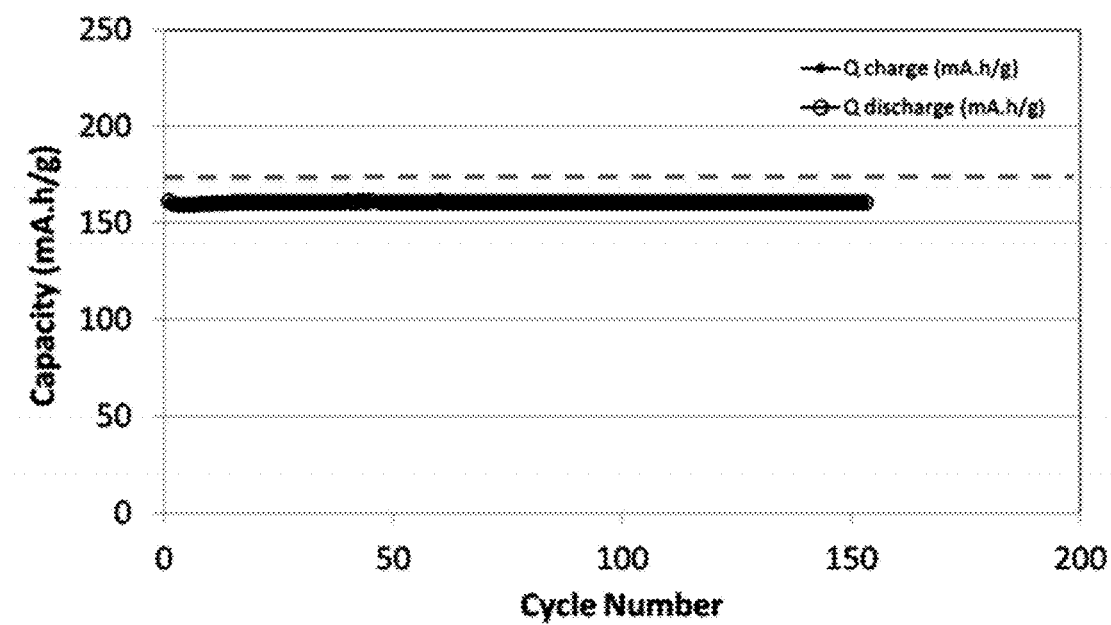
FIG. 10 illustrates the charge and discharge specific capacities as a function of cycle number at a rate of 1C in half-cells of sprayed LTO (Li$_4$Ti$_5$O$_{12}$, anode material) on stainless steel current collectors prepared according to the invention (as described in example 9) and the horizontal dotted line indicates the theoretical specific capacity of the active material.

FIG. 10 shows the charge and discharge specific capacities as a function of cycle number and the horizontal dotted line indicates the theoretical specific capacity of the active material. An excellent cycling stability with a stable value of specific capacity of 161 mAh/g up to 150 cycles at least was recorded in this case.

Example 10

Example 10 shows the cycling performance in half-cells of LCO ($LiCoO_2$, cathode material, Sigma-Aldrich) at C/5 and C/2 for aqueous sprayed slurries, with different contents in active material.

For the dispersion in water, the procedure of Example 1 was first used. No cycling of half-cells could be performed in this case, probably due to improper contact between the active material and the conducting carbon additive.

For that reason the active material is directly mixed with the conductive carbon and the binder in weight percentages of 75 wt. % LCO, 5 wt. % xanthan gum, 20 wt. % conducting carbon (Super C65, Timcal) and 70 wt. % LCO, 5 wt. % xanthan gum, 25 wt. % conducting carbon (Super C65, Timcal). This mixture is dried during 1 hour at 100° C. and then subjected to planetary milling following the same procedure as described for Example 1, allowing for a more intimate contact between the components of the solid mixture. The latter is then dispersed in MilliQ water (12 wt. % solids), followed by magnetic stirring and spraying at ambient temperature on pre-weighed 14-mm Al-disks. The electrodes were weighed after drying at 60° C., allowing for the precise determination of the mass of active material.

Galvanostatic cycling was performed first for 100 cycles at a rate of C/5 (5 hours needed to fully charge the cell, 5 hours to fully discharge the cell), followed by cycling at C/2 (2 hours needed to fully charge the cell, 2 hours to fully discharge the cell).

Figure 11:
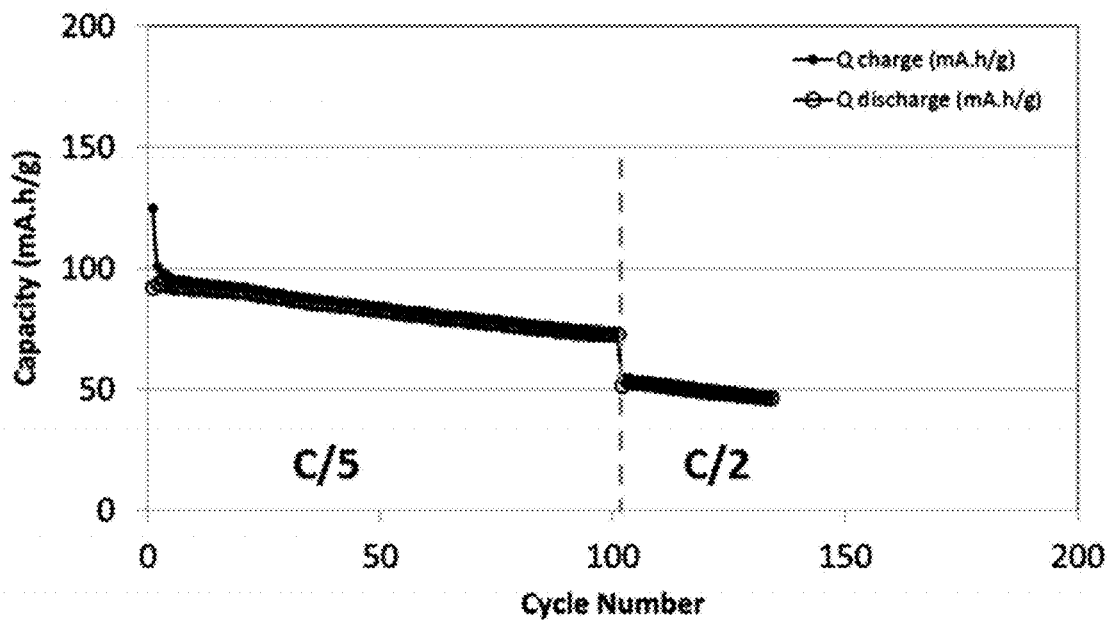
FIG. 11 illustrates the charge and discharge specific capacities as a function of cycle number at C/5 and C/2, in half-cells of LCO (LiCoO$_2$, cathode) for the electrode derived from the 75 wt. % LCO, 5 wt. % xanthan gum, 20 wt. % conducting carbon mixture and the horizontal dotted line indicates the theoretical specific capacity of the active material (as described in example 10).
Figure 12:
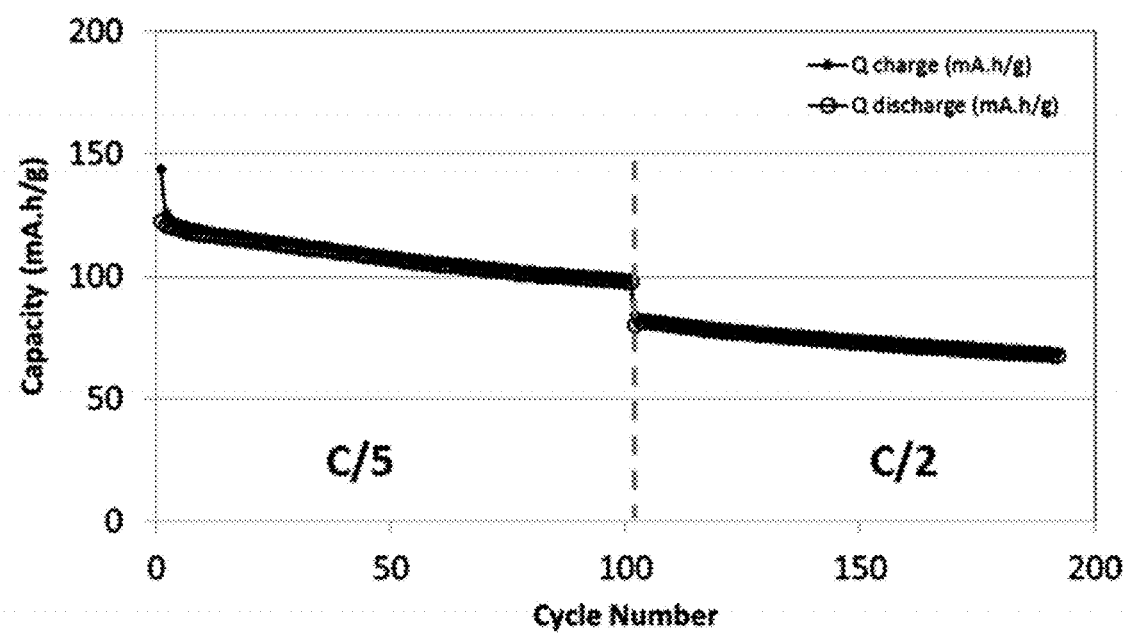
FIG. 12 illustrates at the charge and discharge specific capacities as a function of cycle number C/5 and C/2, in half-cells of LCO (LiCoO$_2$, cathode) for the electrode derived from the 70 wt. % LCO, 5 wt. % xanthan gum, 25 wt. % conducting carbon mixture and the horizontal dotted line indicates the theoretical specific capacity of the active material (as described in example 10).

FIG. 11 shows the charge and discharge specific capacities as a function of cycle number for the electrode derived from the 75 wt. % LCO, 5 wt. % xanthan gum, 20 wt. % conducting carbon mixture. FIG. 12 shows the charge and discharge specific capacities as a function of cycle number for the electrode derived from the 70 wt. % LCO, 5 wt. % xanthan gum, 25 wt. % conducting carbon mixture.

For both contents of LCO, the specific capacity tends to decrease with cycling. A better stability and higher specific capacity values are observed when the relative amount of conducting carbon is increased (70 wt. % of LCO), demonstrating the importance of the contact between the additive and the active material.

Although the cycling stability is not optimized, this example nevertheless demonstrated the possibility of coating another cathode material than LFP by aqueous processing, with xanthan gum as a binder. Improved performances are expected upon using modified or pre-treated LCO.

This example also demonstrates the benefits of the modified procedure when the active materials used display an insulating character.

Example 11

$Li_4Ti_5O_{12}$ coated on Cu and SS electrodes as well as $LiFePO_4$ coated on Al and SS electrodes, prepared as described in the above Examples 4, 5, 6, by the aqueous pathway according to the processes of this invention, were recovered after cell disassembly. The electrodes were covered with 3.5 ml of deionized water without any prior treatment. After contacting by manual stirring or ultrasounds for 10 seconds at ambient temperature, the coatings separated from the current collectors, allowing for the recovery of clean metal bases (Cu, Al or SS). This example demonstrates the benefits of the invention by the fact that a non-toxic solvent (water) can easily be used to recover clean metal current collectors after batteries end-of-life.

Example 12

Example 12 shows a preferred embodiment wherein a shear stress is applied to the solid components prior to the slurry preparation to obtain a flowable sprayable solution In a first instance, 0.025 g of Xanthan gum binder, i.e. the quantity corresponding to that described in Example 1, was dissolved in 3.6 g of MilliQ water, followed by magnetic stirring during 3 hours at 1000 rpm. A gel-like mixture is formed as illustrated in FIGS. 13 A and B, which cannot be processed further, e.g. by spraying.

On the opposite, if the xanthan gum binder is ball-milled with a carbon additive, as reported in Example 1, the resulting solid mixture can be dispersed in water in presence of a cathode or anode active material, leading to a low viscosity sprayable solution.

In a second instance, 0.025 g xanthan gum binder, 0.100 g of Carbon Super C65 (Conducting Carbon, Timcal) and 0.375 g of $LiFePO_4$ (cathode material, Pholicat FE100 as obtained from beLife), were hand-mixed in a vial, leading to a composition by weight percentage of 75:20:5 (active material:conducting carbon:binder). To this mixture, 3.6 g of MilliQ water were then added, resulting in a slurry containing 12 wt. % solids, followed by magnetic stirring during 3 hours at 1000 rpm. A gel-like mixture is formed as illustrated in FIG. 13 C&D, which cannot be further processed either by spraying or by bar-coater in opposition to the process according to the invention, wherein a flowable sprayable solution is obtained.

Example 13 Comparison with US US2013/0108776A1

This example shows the cycling performance at C/5 in half-cells of LTO ($Li_4Ti_5O_{12}$, anode material) on a Cu disc and LFP ($LiFePO_4$, cathode material, Pholicat FE100, beLife) on an Al disk, according to the invention and as obtained in Example 1. Charge and discharge were performed at this rate during 50 cycles to evaluate the stability over time.

Figure 14A:
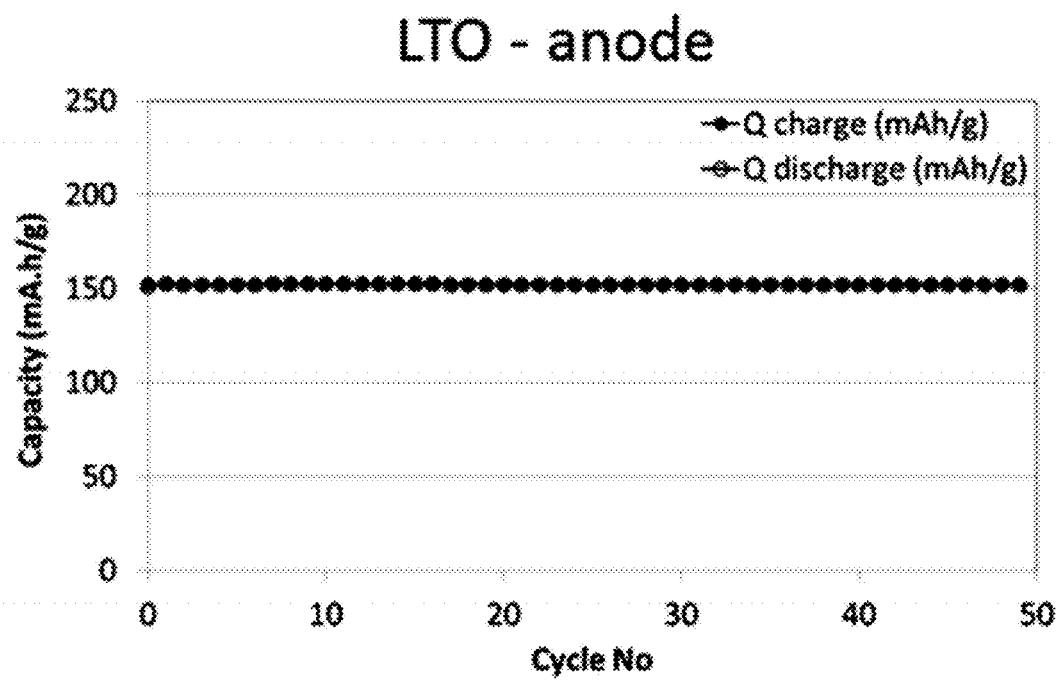
FIG. 14 consists of FIG. 14A and FIG. 14B, and illustrate the charge and discharge specific capacities as a function of cycle number, at a rate of C/5, for half-cells bearing either a LTO-anode ($Li_4Ti_5O_{12}$) on a Cu disc or a LFP-cathode ($LiFePO_4$) on an Al disk, prepared according to the invention and for comparison with data reported in US2013/0108776 (as described in example 13).
Figure 14B:
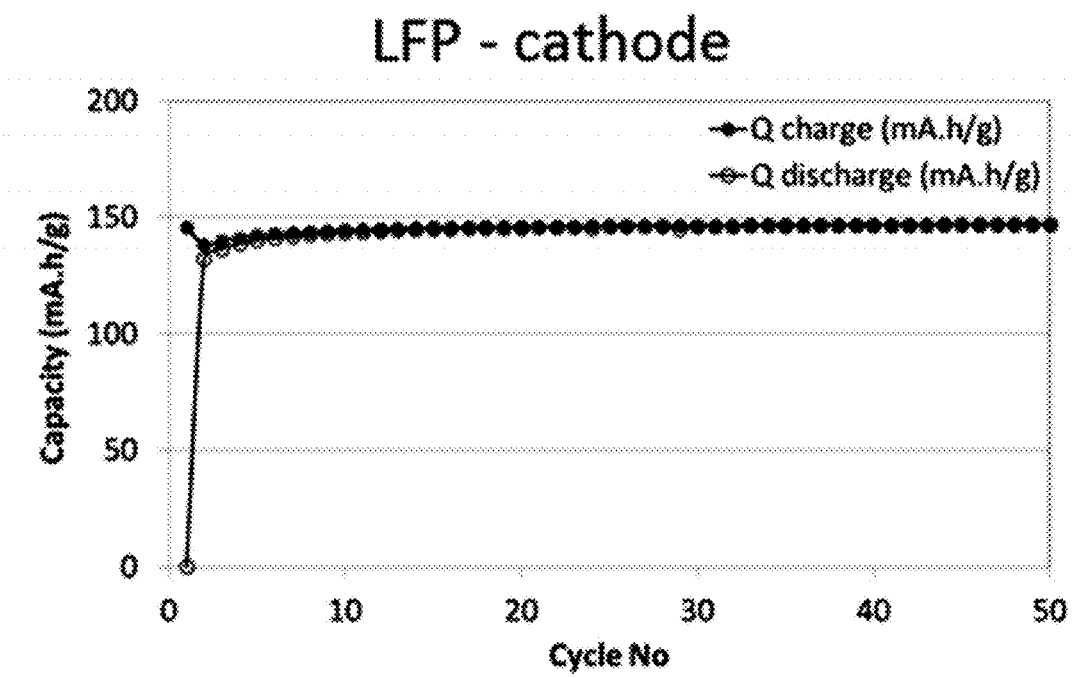
Figure 15A:
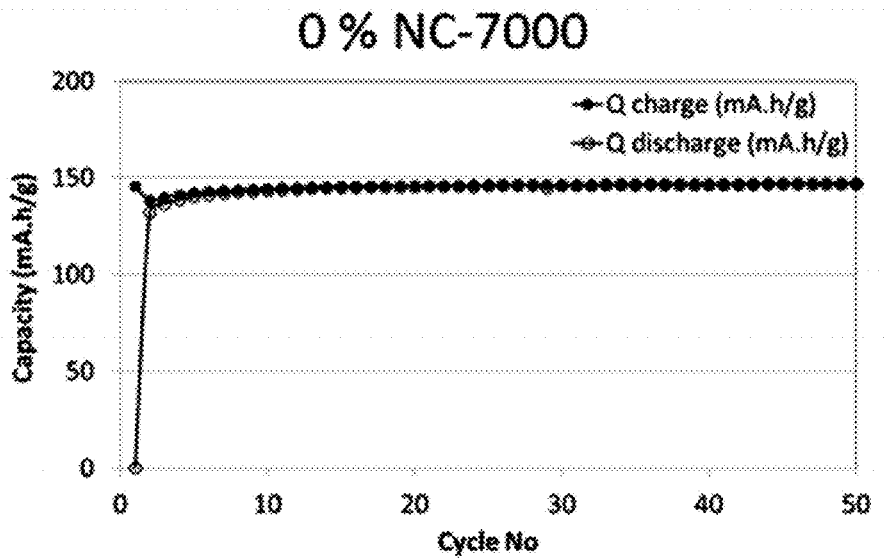
FIG. 15 illustrates the charge and discharge specific capacities as a function of cycle number, at a rate of C/5, for half-cells bearing LFP-cathodes ($LiFePO_4$) prepared as aqueous slurries and sprayed on Al disks. The slurries are prepared with different contents of Multiwalled Carbon Nanotubes NC7000 as conducting additive (0% in FIG. 15A; 2% in FIG. 15B; 15% in FIG. 15C; 50% in FIG. 15D; 100% in FIG. 15E) according to example 14.
Figure 15B:
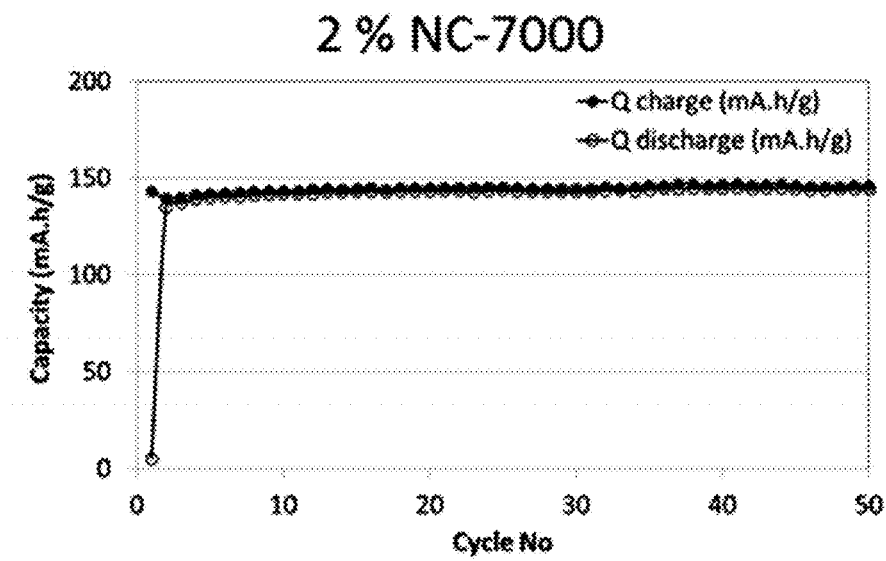
Figure 15C:
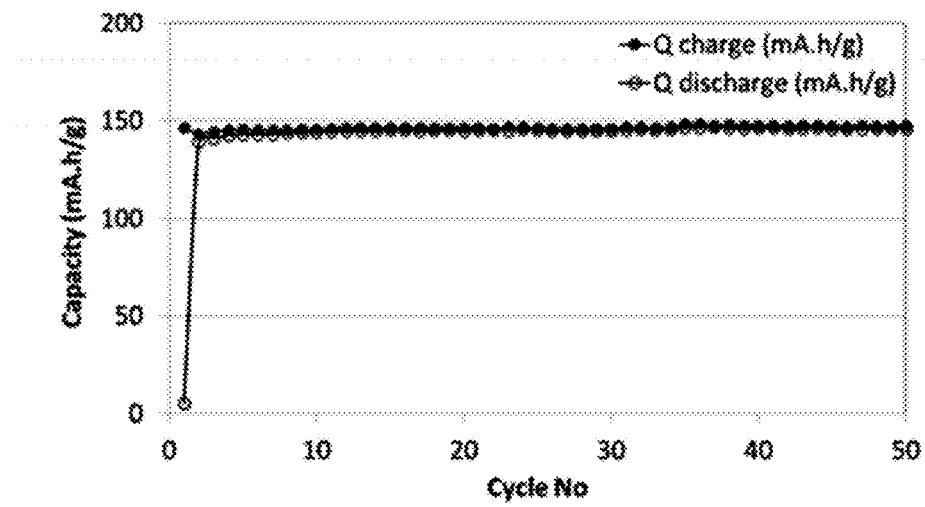
Figure 15D:
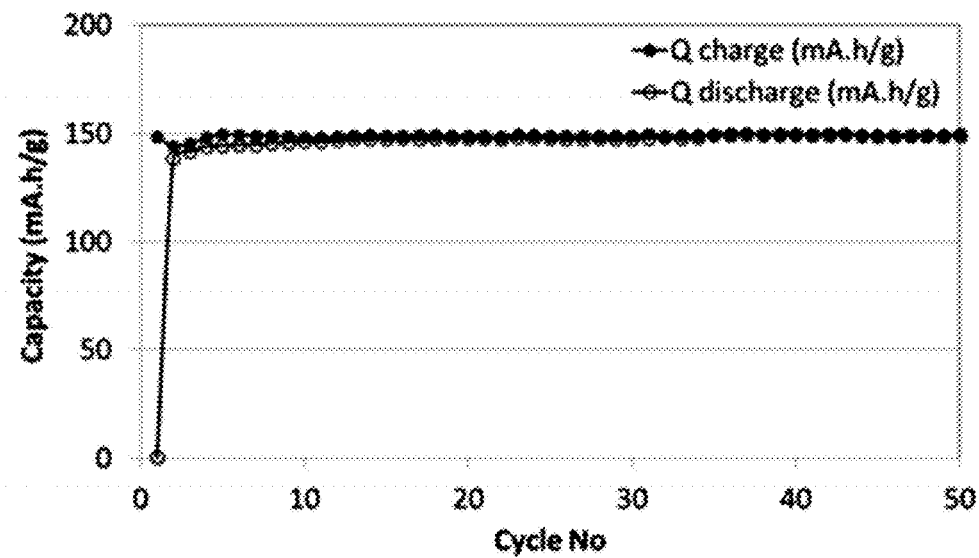
Figure 15E:
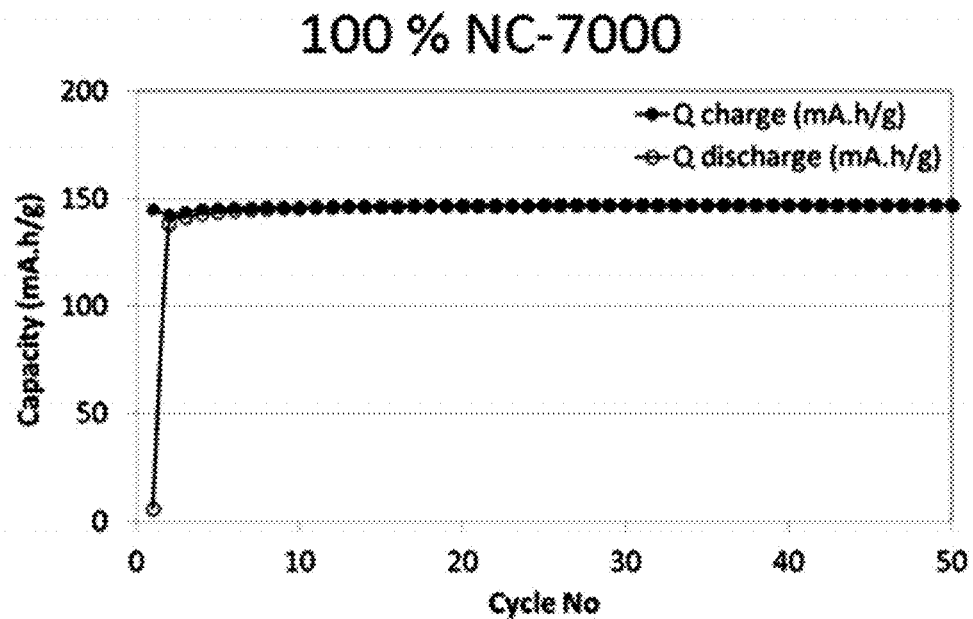
Figure 16A:
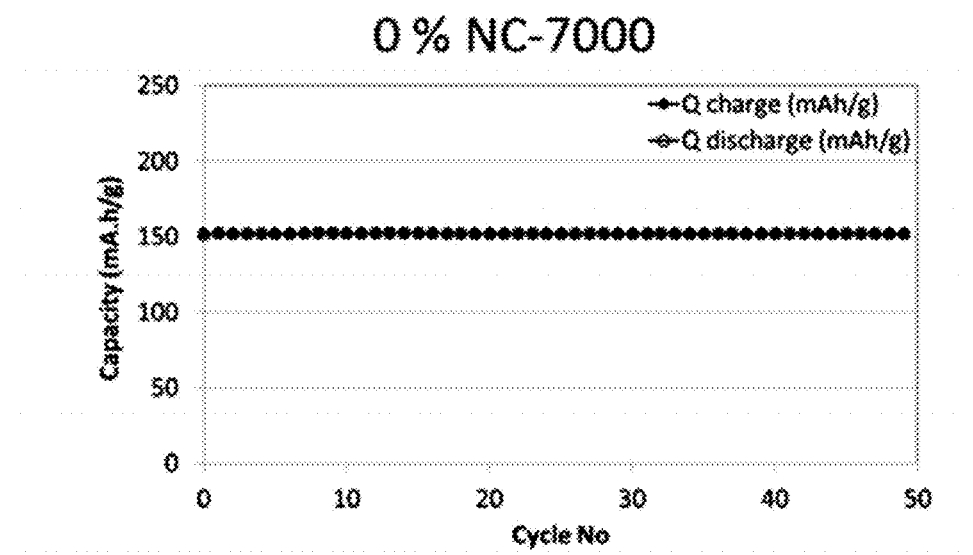
FIG. 16 illustrates the charge and discharge specific capacities as a function of cycle number, at a rate of C/5, for half-cells bearing LTO-anodes ($Li_4Ti_5O_{12}$) prepared as aqueous slurries and sprayed on Cu disks. The slurries are prepared with different contents of Multiwalled Carbon Nanotubes NC7000 (0% in FIG. 16A; 2% in FIG. 16B; 15% in FIG. 16C; 50% in FIG. 16D; 100% in FIG. 16E) according to example 15.
Figure 16B:
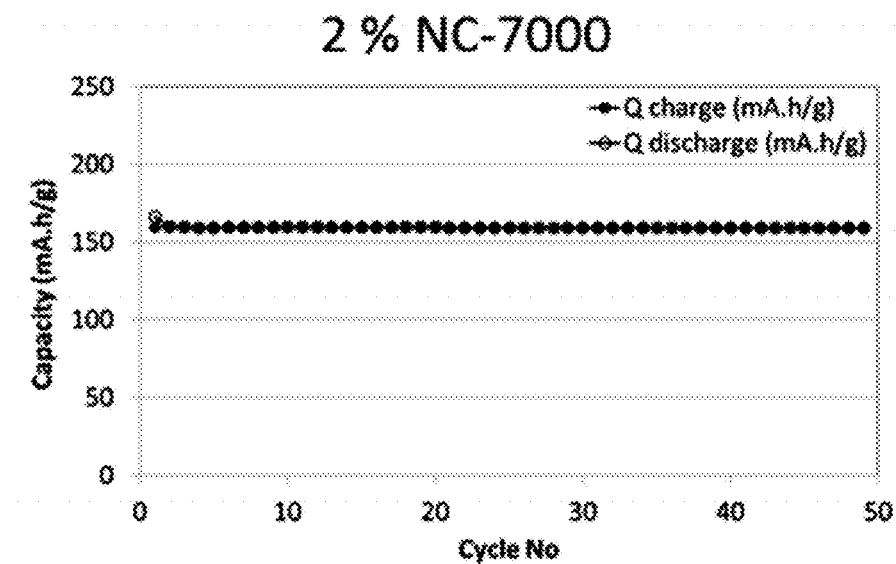
Figure 16C:
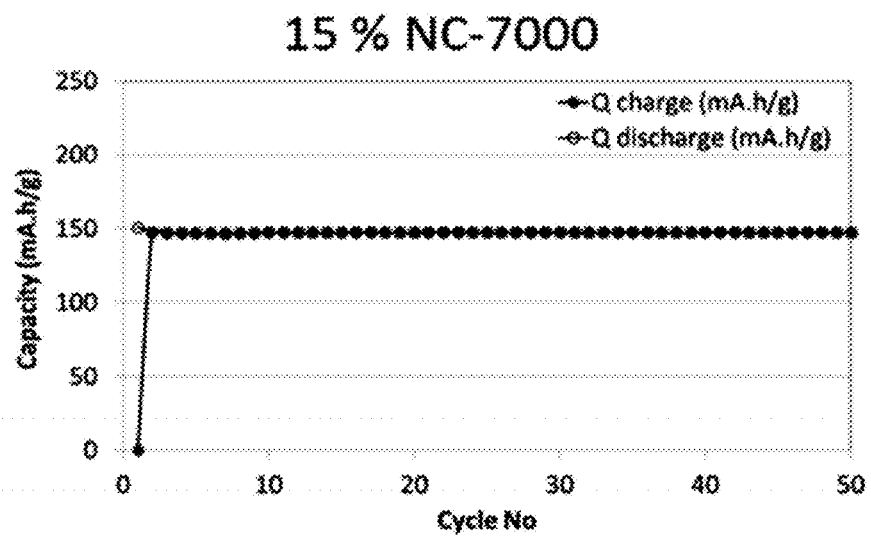
Figure 16D:
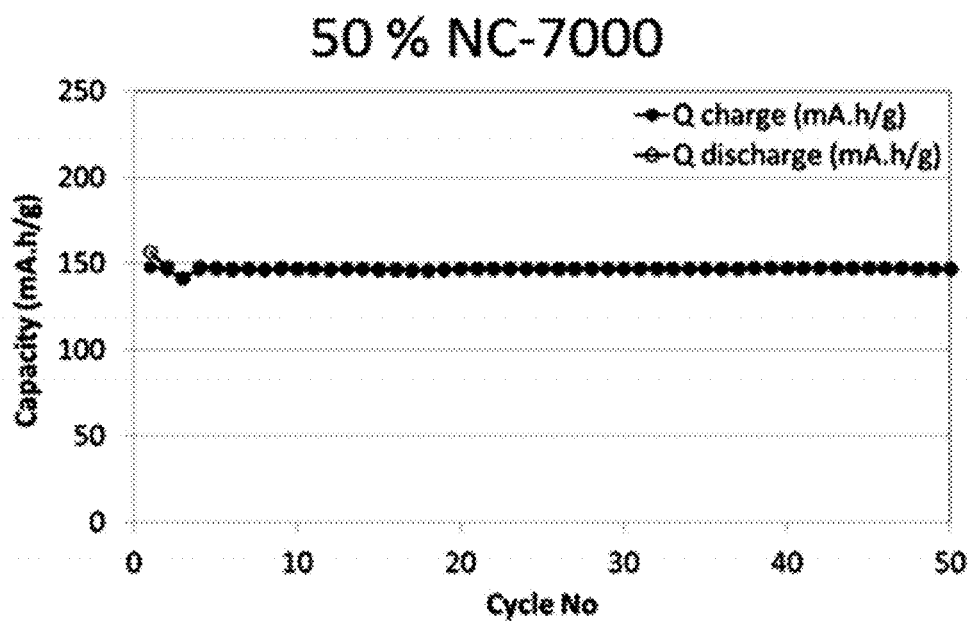
Figure 16E:
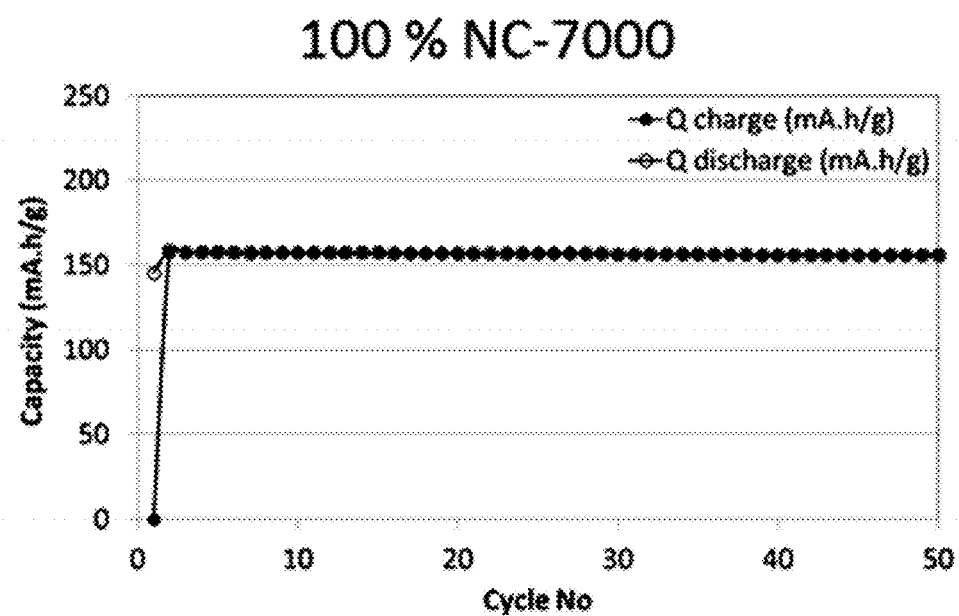

As shown from FIG. 14 and Table 3, the specific capacities remain stable for both of the investigated active materials when cycling is performed during 50 cycles at a rate of C/5. This is opposite to the observations described in US2013/0108776A1, wherein polyethyleneimine is needed as a dispersant for slurry preparation. In this latter case, the specific capacity of $LiFePO_4$ cathode materials decreases with cycling when no polyethyleneimine is added to the mixture. This difference proves that the process according to the invention can lead to electrodes (anodes and cathodes) with a good cycling stability, without need of an additional dispersant in the mixture.

TABLE 3

| Cycle | Specific capacity (mAh/g) - LTO anode | Specific capacity (mAh/g) - LFP cathode |
| --- | --- | --- |
| 1 | 153 | 145 |
| 10 | 153 | 143 |
| 25 | 152 | 146 |
| 50 | 152 | 147 |

Example 14

Example 14 shows the cycling performance in half-cells of LFP ($LiFePO_4$, cathode material, Pholicat FE100, beLife) at a rate of C/5 for aqueous sprayed slurries on Al disks, with different contents of Multiwalled Carbon Nanotubes (MWCNT, NC-7000, Nanocyl) as a conducting additive.

The electrodes were prepared according to the procedure of Example 1: 75 wt. % LFP, 5 wt. % xanthan gum, 20 wt.

% Conducting additive. The classically used Conducting Carbon additive (Super C65, Timcal) was in this case replaced by 2, 15, 50 and 100 wt. % carbon nanotubes. The fraction of total solids in water was 12 wt. %. The obtained aqueous slurry was then sprayed at ambient temperature on pre-weighed 14-mm Al-disks. The electrodes were weighed after drying at 60° C., allowing for the precise determination of the mass of active material.

Galvanostatic cycling was performed during 50 cycles at C/5 (5 hours needed to fully charge the cell, 5 hours to fully discharge the cell).

FIG. 15 represents the charge and discharge specific capacities as a function of cycle number and Table 4 shows the discharge capacity at cycle 50 for each composition.

TABLE 4

| CNT contents (wt. %) | Specific discharge capacity @ cycle 50 (mAh/g) |
| --- | --- |
| 0 | 147 |
| 2 | 146 |
| 15 | 148 |
| 50 | 150 |
| 100 | 147 |

Stable cycling is observed at C/5 whatever the contents in carbon nanotubes as a conducting carbon additive. Indeed, even with full replacement of the classically used Super C65, i.e. 100% CNT, similar values of capacities are obtained for this cycling. The values of specific discharge capacity also remain in the same range after 50 cycles, with values comprised between 146 and 150 mAh/g. These results prove that the procedure presented here is compatible with the dispersion of multiwalled carbon nanotubes in aqueous slurries for Li-ion battery electrodes preparation.

Example 15

Example 15 shows the cycling performance in half-cells of LTO ($Li_4Ti_5O_{12}$, anode material) at a rate of C/5 for aqueous sprayed slurries on Cu discs, with different contents of Multiwalled Carbon Nanotubes (MWCNT, NC-7000, Nanocyl) as a conducting additive.

The electrodes were prepared according to the procedure of Example 1: 75 wt. % LTO, 5 wt. % xanthan gum, 20 wt. % Conducting additive. The classically used Conducting Carbon additive (Super C65, Timcal) was in this case replaced by 2, 15, 50 and 100 wt. % carbon nanotubes. The fraction of total solids in water was 12 wt. %. The obtained aqueous slurry was then sprayed at ambient temperature on pre-weighed 14-mm Cu-disks. The electrodes were weighed after drying at 60° C., allowing for the precise determination of the mass of active material.

Galvanostatic cycling was performed during 50 cycles at C/5 (5 hours needed to fully charge the cell, 5 hours to fully discharge the cell).

FIG. 16 represents the charge and discharge specific capacities as a function of cycle number and Table 5 shows the discharge capacity at cycle 50 for each composition.

TABLE 5

| CNT contents (wt. %) | Specific discharge capacity @ cycle 50 (mAh/g) |
| --- | --- |
| 0 | 152 |
| 2 | 159 |
| 15 | 147 |
| 50 | 147 |
| 100 | 156 |

Stable cycling is observed at C/5 whatever the contents in carbon nanotubes as a conducting carbon additive. Indeed, even with full replacement of the classically used Super C65, i.e. 100% CNT, similar values of capacities are obtained for this cycling. The values of specific discharge capacity also remain in the same range after 50 cycles, with values comprised between 147 and 159 mAh/g. These results prove that the procedure presented here is compatible with the dispersion of multiwalled carbon nanotubes in aqueous slurries for Li-ion battery electrodes preparation.

Example 16

This example illustrates the improved behavior in terms of adhesion of the coatings obtained by the process according to the invention. Three coatings have been prepared for an anode active material (LTO, $Li_4Ti_5O_{12}$, anode material on a Cu foil according to the invention and as obtained in Example 1. Two different coating techniques have been used, namely bar-coater and manual spray. The classical composition made of PVDF binder in NMP solvent has also been compared with the aqueous pathway using XG as a binder. No further treatment was applied to the substrates prior to the coatings. This is opposite to US2013/0108776A1, where a surface treatment, e.g. plasma corona treatment is applied in order to raise the surface energy of the surface to at least the surface tension of the mixed dispersion.

The adhesion has been tested for three types of coatings in each case by the use of the ASTM D3359-97 procedure. This test is based on the application of a force or an energy to separate two materials linked by a common surface. Adhesive paper is used to peel off the coating with an angle of 180°.

In the present case, the adhesion was qualitatively evaluated upon observation of the substrate as well as of the adhesive paper after the test.

Figure 17:
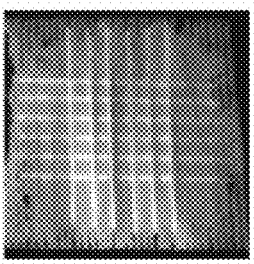
FIG. 17 illustrates adherence tests of LTO ($Li_4Ti_5O_{12}$) based anodes on a Cu foil. Coatings were realized by bar-coating or manual spray, in aqueous as well as organic slurries, as described in example 16.
Figure 17:
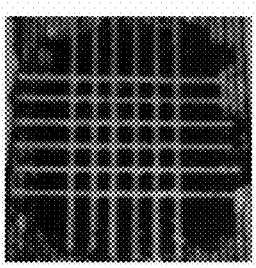
Figure 17:
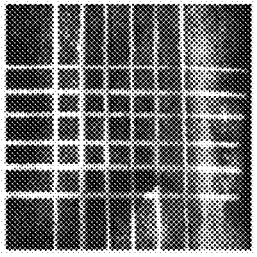
Figure 17:
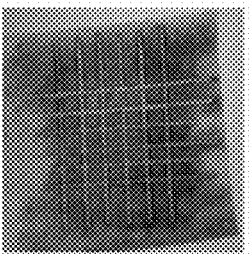
Figure 17:
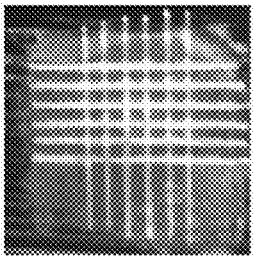
Figure 17:
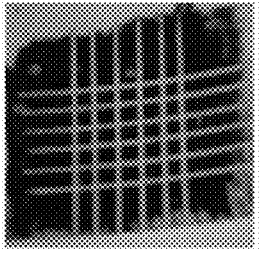

FIG. 17 shows adhesion results in different conditions for LTO active material on a copper foil. On the left side is shown a picture of the copper foil after the adhesion test and on the right side a picture of the corresponding adhesive paper after the test.

The results clearly show that the process according to the invention using water and manual spray as coating method displays the better behavior in terms of adhesion when compared with another coating technique (bar-coater) or with another ink preparation process (NMP+PVDF). Indeed, more coating remains present on the copper foil when the process according to the invention is used, and less material is seen on the adhesive paper in this case. This experiment demonstrates that the spraying technique leads to distinguished features in comparison to the bar-coating process, in addition to the fact that the water-based slurry making use of xanthan gum also shows superiority in terms of adhesion in comparison to the organic pathway.

Example 17

Example 17 shows the cycling performance at C/10 for 20 cycles and at C/2 for 80 cycles of a full Li-ion cell comprising an anode based on LTO (Li$_4$Ti$_5$O$_{12}$, anode material) on a Cu disc and a cathode based on LFP (LiFePO$_4$, cathode material, Pholicat FE100, beLife) on an Al disk, according to the invention and as obtained in Example 1. Both electrodes were assembled in a CR2032 coin cell, with a Celgard® separator soaked with 80 μL of LP71 (1 M LiPF$_6$ in Ethylene carbonate:Diethylcarbonate Dimethylcarbonate (EC:DEC:DMC) 1:1:1 weight ratios) electrolyte was placed in-between. The charge-discharge cycles were recorded between 1.0 and 2.5 V (vs. Li$^+$/Li) with a Biologic VMP3 multichannel potentiostat or a Neware battery cycler at 25° C.

Figure 18:
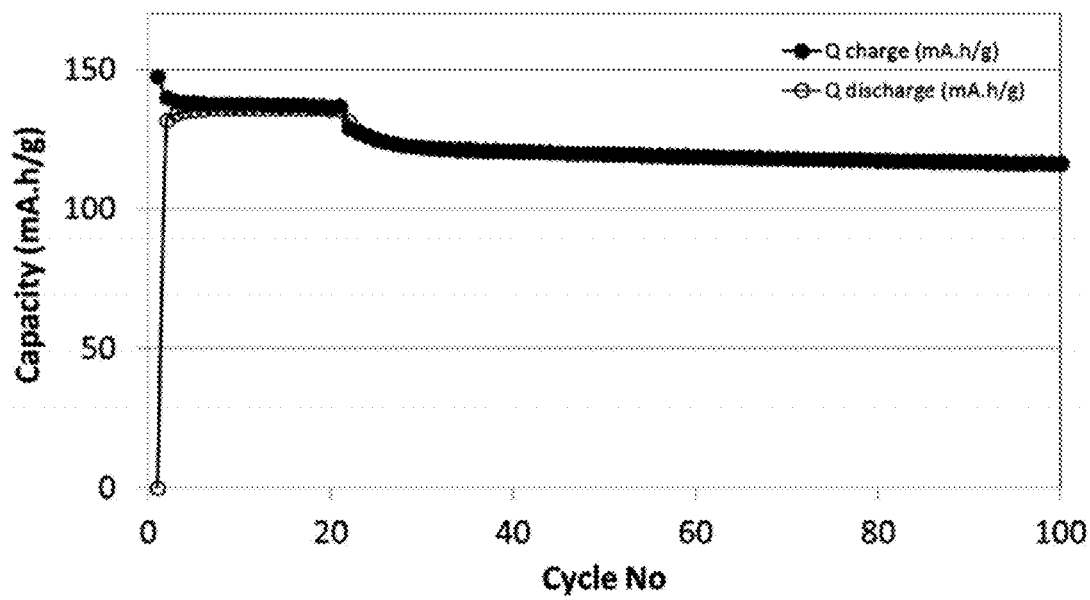
FIG. 18 illustrates the charge and discharge specific capacities as a function of cycle number at a rate of C/10 for 20 cycles and C/2 for 80 cycles of a full Li-ion cell comprising an anode based on LTO ($Li_4Ti_5O_{12}$) sprayed on a Cu disc and a cathode based on LFP ($LiFePO_4$) sprayed on an Al disk, as described in example 17.

As shown from FIG. 18 and Table 6, a good cycling stability is recorded either at a rate of C/10 (10 hours to fully charge the cell, 10 hours to fully discharge it) as well as at C/2. The specific capacity of the cell is given as a function of the mass of LFP-cathode material. In this latter case, the specific capacity of the full cell stabilizes at ~115 mAh/g $_{LFP}$, i.e. 115 mAh per gram of LFP present at the cathode.

These results indicate that the process described in the invention can lead to electrodes (anodes and cathodes) that work well in a Li-ion full cell, with good cycling stability.

TABLE 6

| Cycle | Rate | Specific capacity (mAh/g$_{LFP}$) |
|---|---|---|
| 5 | C/10 | 138 |
| 15 | | 137 |
| 25 | C/2 | 125 |
| 50 | | 120 |
| 100 | | 116 |

Example 18

This Example shows the cycling performance at C/10 for 20 cycles and at C/2 for 80 cycles of a full Li-ion cell comprising an anode based on LTO (Li$_4$Ti$_5$O$_{12}$, anode material) on a Cu disc and a cathode based on LFP (LiFePO$_4$, cathode material, Pholicat FE100, beLife) on an Al disk, according to the invention and as obtained in Examples 14 and 15. In this case, for both the electrodes, the conducting carbon additive was totally replaced with multiwalled carbon nanotubes (Nanocyl NC-7000). Both electrodes were assembled in a CR2032 coin cell, with a Celgard® separator soaked with 80 μL of LP71 (1 M LiPF$_6$ in Ethylene carbonate:Diethylcarbonate:Dimethylcarbonate (EC:DEC:DMC) 1:1:1 weight ratios) electrolyte was placed in-between. The charge-discharge cycles were recorded between 1.0 and 2.5 V (vs. Li$^+$/Li) with a Biologic VMP3 multichannel potentiostat or a Neware battery cycler at 25° C.

Figure 19:
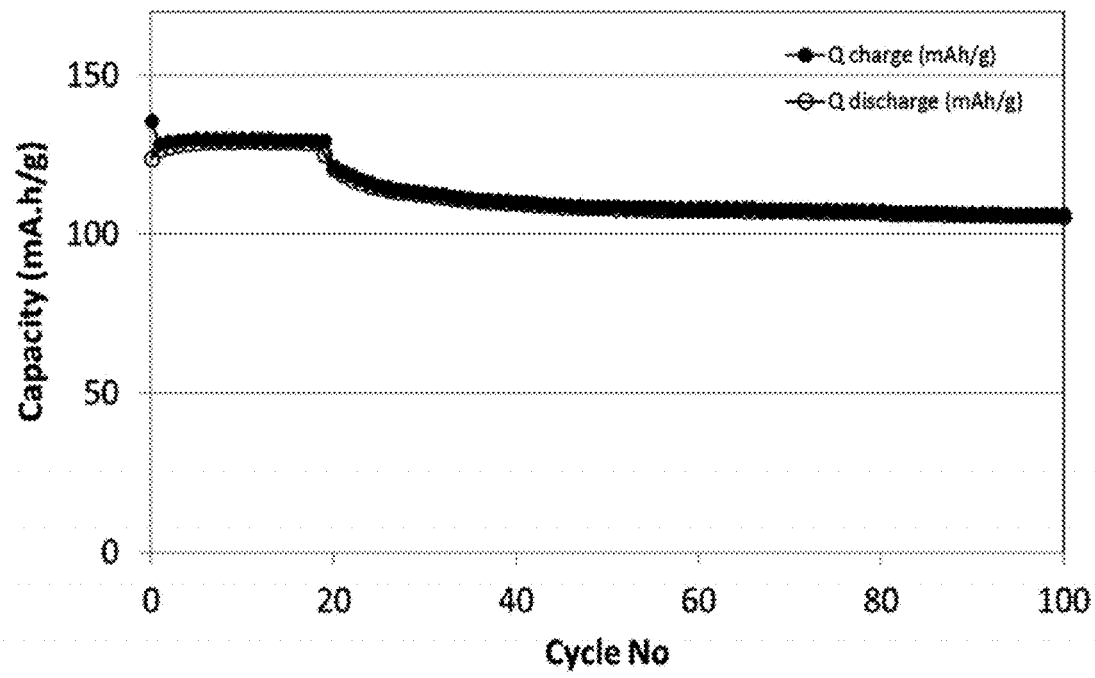
FIG. 19 illustrates the charge and discharge specific capacities as a function of cycle number at a rate of C/10 for 20 cycles and C/2 for 80 cycles of a full Li-ion cell comprising an anode based on LTO ($Li_4Ti_5O_{12}$) sprayed on a Cu disc and a cathode based on LFP ($LiFePO_4$) sprayed on an Al disk, and wherein the conducting carbon additive of both the electrodes is composed of Multiwalled Carbon Nanotubes only, as described in example 18.

As shown from FIG. 19 and Table 7, a good cycling stability is recorded either at a rate of C/10 (10 hours to fully charge the cell, 10 hours to fully discharge it) as well as at C/2. The specific capacity of the cell is given as a function of the mass of LFP-cathode material. In this latter case, the specific capacity of the full cell stabilizes at ~105 mAh/g $_{LFP}$, i.e. 115 mAh per gram of LFP present at the cathode These results indicate that the process described in the invention can lead to electrodes (anodes and cathodes) bearing only multiwalled carbon nanotubes as a conducting additive that work well in a Li-ion full cell, with good cycling stability. The performances remain comparable to those recorded for a full cell assembled from electrodes prepared according to the invention and as described in Example 1, with Timcal Super C65 as a conducting additive.

TABLE 7

| Cycle | Rate | Specific capacity (mAh/g$_{LFP}$) |
|---|---|---|
| 5 | C/10 | 129 |
| 15 | | 130 |
| 25 | C/2 | 115 |
| 50 | | 109 |
| 100 | | 106 |

Example 19

In Example 19 the cycling performance at C/5 in half-cells of LTO (as-prepared particulate Li$_4$Ti$_5$O$_{12}$, anode material) on a Cu disc according to the invention and as obtained in Example 1 were compared to the cycling performance at C/5 for a commercial LTO (Sigma-Aldrich, Lithium Titanate, Spinel, >99%) on a Cu disc, processed in the same way as described in Example 1.

Galvanostatic cycling was performed at a rate of C/5 (5 hours needed to fully charge the cell, 5 hours to fully discharge the cell).

Figure 20:
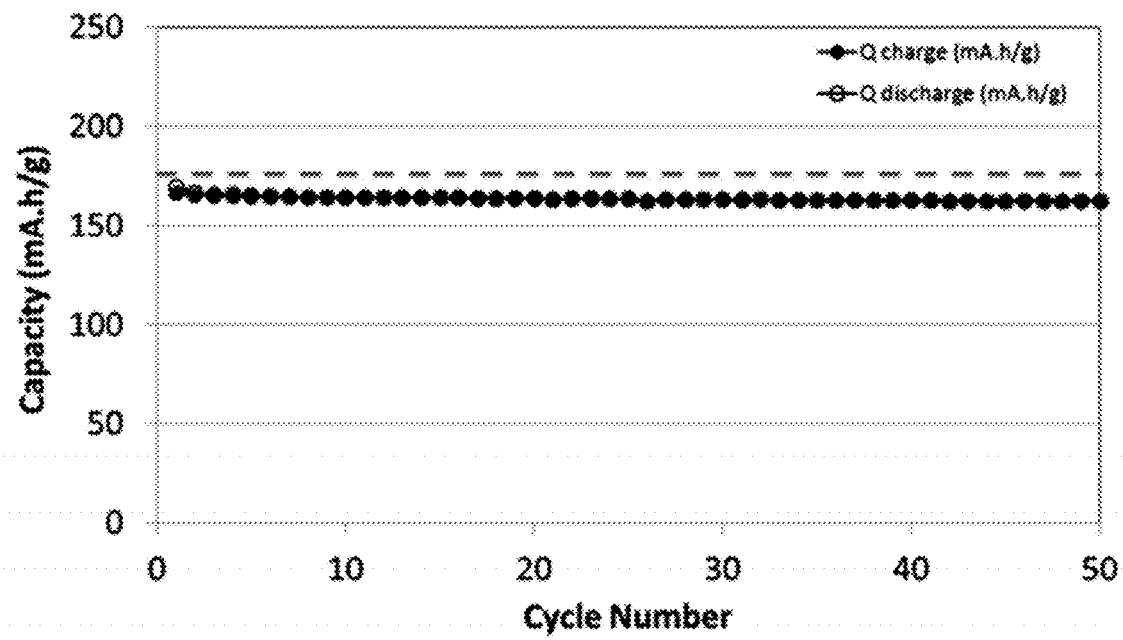
FIG. 20 illustrates the charge and discharge specific capacities as a function of cycle number, at a rate of C/5, for a half-cell bearing an anode prepared with a commercial LTO ($Li_4Ti_5O_{12}$) material and sprayed on a Cu disc, as described in example 19. The dotted line represents the theoretical capacity of the active material.

FIG. 20 shows the charge and discharge specific capacities as a function of cycle number and the horizontal dotted line indicates the theoretical specific capacity of the active material for the sprayed commercial LTO/Cu electrode, which can be compared with the sprayed LTO/Cu electrode as obtained from Example 1 and illustrated in FIG. 1.

The specific capacity in the present case after 20 cycles was 164 mAh/g, the same value as for the as-prepared particulate LTO/Cu electrode obtained from example 1 (163 mAh/g).

The specific capacity per cycle is also listed in the below Table 8.

TABLE 8

| Cycle | Specific capacity Example 1 (mAh/g) | Specific capacity Example 19 (mAh/g) |
|---|---|---|
| 1 | 163 | 166 |
| 10 | 163 | 164 |
| 20 | 163 | 164 |
| 50 | — | 162 |

The global behavior is the same for the electrodes of Example 1 (as-prepared particulate LTO) and Example 19 (commercial LTO). The comparison of specific capacities reported in the Table 8 shows that the performances are identical, whatever the origin of the used anode active material.

Example 20

In this example the cycling performance at variable rates in half-cells of LTO (as-prepared particulate Li$_4$Ti$_5$O$_{12}$, anode material) on a Cu disc according to the invention and as obtained in Example 1 were compared to the cycling performance at variable rates for a commercial LTO (Sigma-Aldrich, Lithium Titanate, Spinel, >99%) on a Cu disc, processed in the same way as described in Example 1.

Galvanostatic cycling was performed in both cases first at a rate of C/5 (5 hours needed to fully charge the cell, 5 hours to fully discharge the cell) for a given number of cycles, followed by cycling at higher rates (C/2, 1C, 2C, 5C, 10C and back to C/5), for 10 cycles at each rate. (10C: 6 minutes needed to fully charge the cell, 6 minutes to fully discharge the cell).

Figure 21:
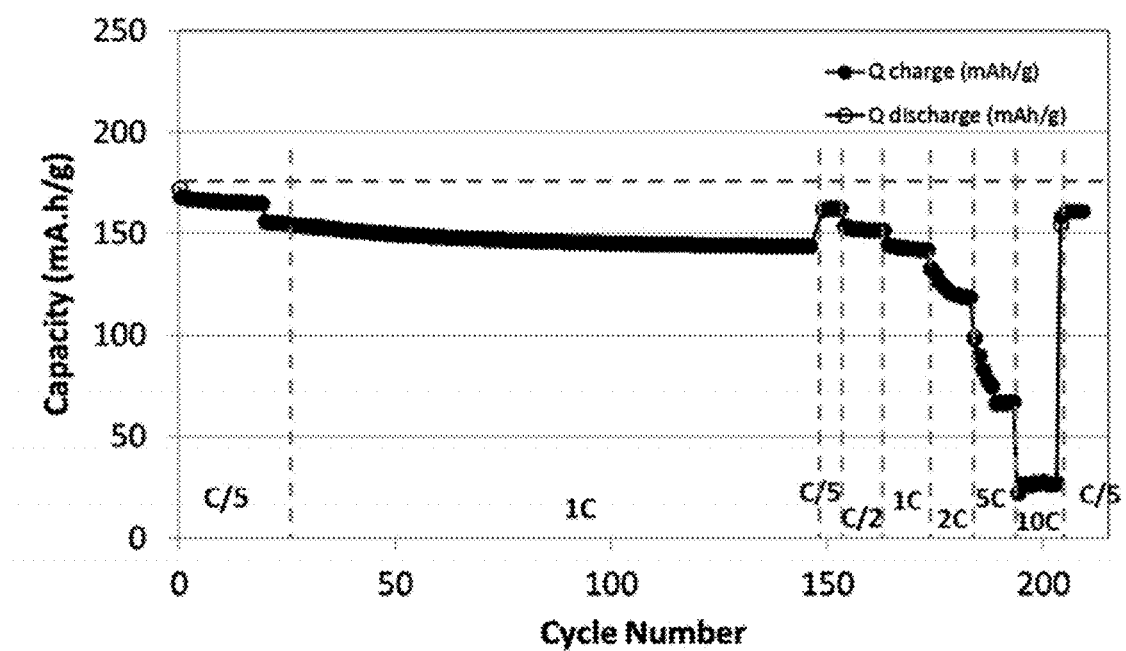
FIG. 21 illustrates the charge and discharge specific capacities as a function of cycle number, at variable rates, for a half-cell bearing an anode prepared with a commercial LTO ($Li_4Ti_5O_{12}$) material and sprayed on a Cu disc, as described in example 20. The dotted line represents the theoretical capacity of the active material.

FIG. 21 shows the charge and discharge specific capacities as a function of cycle number and the horizontal dotted line indicates the theoretical specific capacity of the active material for the sprayed commercial LTO/Cu electrode, which can be compared with the sprayed LTO/Cu electrode as obtained from Example 1 and illustrated in FIG. 3.

The specific capacity per cycle is also listed in the below Table 9.

TABLE 9

| Rate | Specific capacity Example 1 (mAh/g) | Specific capacity Example 20 (mAh/g) |
|---|---|---|
| C/5 | 162 | 162 |
| C/2 | 159 | 152 |
| C | 143 | 143 |
| 2C | 133 | 121 |
| 5C | 66 | 78 |
| 10C | 30 | 27 |
| C/5 | 162 | 161 |

The global behavior is the same for the electrodes of Example 1 (as-prepared particulate LTO) and Example 20 (commercial LTO). The comparison of specific capacities reported in the Table 9 shows that the performances are in the same range, whatever the origin of the used anode active material. Full recovery of specific capacity at C/5 after cycling at high rates is also observed in both cases.

The invention claimed is:

1. A process to prepare an electrode for an electrochemical storage device comprising the following steps in the following order:
   (ai) mixing solid xanthan gum with a source of conducting carbon particles and, optionally the active material by shear stress;
   (aii) adding an active material to the resulting mixture obtained in step (ai) in case the active material was not added or not sufficiently added in step (ai);
   (aiii) adding water to the resulting mixture obtained in step (ai) or (aii) to form a flowable aqueous slurry composition such that the content of solids in the resulting aqueous slurry is between 2 and 25 wt. %;
   (aiv) spraying the flowable aqueous slurry composition consisting of water, xanthan gum, the conducting carbon particles and the active material on an electrode base to obtain a covered electrode base;
   (av) drying the covered electrode base;
   wherein an improved adhesion is obtained between the electrode base and the coating formed by the sprayed flowable aqueous slurry composition.

2. The process according to claim 1, wherein the electrode is an anode and the active material is selected in the group consisting of a carbon based material, Si—C composites, Sn—C composites, Sn or Si particles, $LiTiO_2$ or $Li_4Ti_5O_{12}$.

3. The process according to claim 1, wherein the electrode is a cathode and the active material is selected from the group consisting of $LiCoO_2$, $LiNiO_2$, $LiMn_2O_4$, $LiFePO_4$, $LiMnPO_4$, $LiFe_xMn_yCO_{1-x}PO_4$, $LiNi_xMn_yCo_{1-x-y}O_2$, $Li_{1+x}Ni_yMn_zCo_{1-x-y-z}O_2$, $LiNi_xMn_yCo_2Al_{1-x-y-z}O_2$, $Li_{1+x}Ni_yMn_{1-x}Co_zO_2$, or $Cu_2ZnSn(S,Se)_4$.

4. The process according to claim 1, wherein the electrode base is composed of a metal or carbon and/or nanotube-covered substrates.

5. The process according to claim 1, wherein in step (ai) (aii) the content of active material is between 70 and 95 wt. %, the content of solid xanthan gum is between 2 and 8 wt. % and the content of the source of conducting carbon particles is between 1 and 25 wt %.

6. The process according to claim 1, wherein in step (ai) first the solid xanthan gum is mixed with the conducting carbon particles, (aii) adding active material to the resulting mixture and (aiii) adding water to the resulting mixture obtained in step (aii).

7. The process according to claim 1, wherein in step (ai) first the solid xanthan gum is mixed with the conducting carbon particles and active material and (aiii) adding water to the resulting mixture obtained in step (ai).

8. The process according to claim 1, wherein the mixing in step (ai) is performed by planetary ball milling.

9. A process to prepare an electrode for an electrochemical storage device consisting of the following steps in the following order:
   (a) mixing solid xanthan gum with a source of conducting carbon particles and, optionally the active material by shear stress at about 400 rpm in intervals;
   (b) adding an active material to the resulting mixture obtained in step (a) in case the active material was not added or not sufficiently added in step (a);
   (c) drying the resulting mixture obtained in step (a) or (b);
   (d) adding water to the resulting mixture obtained in step (c) and stirring to form a flowable aqueous slurry composition such that the content of solids in the resulting aqueous slurry is between 2 and 25 wt. %;
   (e) spraying the flowable aqueous slurry composition consisting of water, xanthan gum, the conducting carbon particles and the active material on an electrode base to obtain a covered electrode base; and
   (f) drying the covered electrode base;
   wherein an improved adhesion is obtained between the electrode base and the coating formed by the sprayed flowable aqueous slurry composition.

* * * * *